United States Patent
Wei et al.

(10) Patent No.: US 10,982,075 B2
(45) Date of Patent: Apr. 20, 2021

(54) POLYMER LATEX FOR DIP-MOLDING APPLICATIONS

(71) Applicant: Synthomer Sdn. Bhd., Kluang (MY)

(72) Inventors: Zhenli Wei, Masai Johor (MY); Dieter Wolters, Duelmen (DE); Floyd Greaves, Kluang (MY); Alexandra Abele, Duelmen (DE); Thian Hong Ng, Parit Raja (MY)

(73) Assignee: Synthomer Sdn. Bhd., Johor DarulTakzim (MY)

( * ) Notice: Subject to any disclaimer, the term of this patent is extended or adjusted under 35 U.S.C. 154(b) by 143 days.

(21) Appl. No.: 16/305,251

(22) PCT Filed: Jun. 1, 2016

(86) PCT No.: PCT/MY2016/000033
§ 371 (c)(1),
(2) Date: Nov. 28, 2018

(87) PCT Pub. No.: WO2017/209596
PCT Pub. Date: Dec. 7, 2017

(65) Prior Publication Data
US 2020/0255634 A1 Aug. 13, 2020

(51) Int. Cl.
| | | |
|---|---|---|
| *C08L 9/04* | (2006.01) | |
| *C08F 236/10* | (2006.01) | |
| *C08F 236/12* | (2006.01) | |
| *C08F 236/14* | (2006.01) | |
| *C08L 9/08* | (2006.01) | |
| *C08L 13/02* | (2006.01) | |
| *B29D 99/00* | (2010.01) | |
| *C08F 2/22* | (2006.01) | |
| *B29C 41/14* | (2006.01) | |
| *B29K 9/00* | (2006.01) | |
| *B29K 19/00* | (2006.01) | |

(52) U.S. Cl.
CPC ............ *C08L 9/04* (2013.01); *B29D 99/0067* (2013.01); *C08F 2/22* (2013.01); *C08F 236/10* (2013.01); *C08F 236/12* (2013.01); *C08F 236/14* (2013.01); *C08L 9/08* (2013.01); *C08L 13/02* (2013.01); *B29C 41/14* (2013.01); *B29K 2009/00* (2013.01); *B29K 2019/00* (2013.01)

(58) Field of Classification Search
CPC ......... C08L 9/04; C08L 13/02; B29D 99/067; C08F 236/14; C08F 2/22; C08F 236/12; C08F 236/10; B29K 2019/00; B29K 2009/00; B29C 41/14
See application file for complete search history.

(56) References Cited

U.S. PATENT DOCUMENTS

| | | | |
|---|---|---|---|
| 5,750,618 A | 5/1998 | Vogt et al. | |
| 6,844,385 B1 | 1/2005 | Hagiwara et al. | |
| 7,345,111 B2 | 3/2008 | Ozawa et al. | |
| 8,044,138 B2 | 10/2011 | Han et al. | |
| 8,975,351 B2 | 3/2015 | Kim et al. | |
| 9,243,117 B2 | 1/2016 | Khoo et al. | |
| 9,803,070 B2 | 10/2017 | Yang et al. | |
| 2010/0093913 A1 | 4/2010 | Jones et al. | |
| 2011/0229646 A1 | 9/2011 | Kim et al. | |
| 2014/0302265 A1* | 10/2014 | Yang et al. | C08L 9/04 428/36.8 |
| 2017/0283599 A1* | 10/2017 | Cha et al. | C08J 5/02 |
| 2019/0085157 A1* | 3/2019 | Kim et al. | C08L 9/04 |

FOREIGN PATENT DOCUMENTS

| | | | |
|---|---|---|---|
| EP | 0792891 A1 | 9/1997 | |
| EP | 1209192 A1 | 5/2002 | |
| JP | 2008231206 A | 10/2008 | |
| JP | 2017538048 A | 12/2017 | |
| KR | 10-2016-0114799 | * 10/2016 | ............ A41D 19/00 |
| WO | 2007015450 A1 | 2/2007 | |
| WO | 2013077585 A1 | 5/2013 | |
| WO | 2016064173 A1 | 4/2016 | |
| WO | 2016087255 A1 | 6/2016 | |

* cited by examiner

*Primary Examiner* — Nathan M Nutter
(74) *Attorney, Agent, or Firm* — The Webb Law Firm

(57) ABSTRACT

The present invention relates to a polymer latex for dip-molding applications including: particles of a carboxylated conjugated diene nitrile latex polymer in combination or association with particles of a latex polymer including at least one oxirane-functional group, to the use of said polymer latex for the production of dip-molded articles or for coating or impregnating a substrate, to compounded compositions including said polymer latex, to a method for making dip-molded articles and to articles made by using said polymer latex.

25 Claims, No Drawings

POLYMER LATEX FOR DIP-MOLDING APPLICATIONS

CROSS-REFERENCE TO RELATED APPLICATION

This application is the United States national phase of International Application No. PCT/MY2016/000033 filed Jun. 1, 2016, the disclosure of which is hereby incorporated in its entirety by reference.

The present invention relates to a polymer latex for dip-molding applications, to a method for the preparation of such a polymer latex, to the use of said polymer latex for the production of dip-molded articles for a coating for impregnating a substrate, to a compounded latex composition comprising said polymer latex, to a method for making dip-molded articles and to articles made by using said polymer latex.

BACKGROUND OF THE INVENTION

In the art of dip-molded articles it is in general desired to achieve a high tensile strength and at the same time high elongation of the film forming the dip-molded article to provide high mechanical strength and desired softness to the article. This is particularly important for surgical gloves. Furthermore, in the recent past it was discovered that a growing number of persons show allergic reactions to dip-molded articles, for example a natural rubber latex that has been used commonly in the past in the manufacturing of dip-molded latex products contains up to 5% of non-rubber components such as proteins, lipids and trace elements. Users of natural rubber latex products have developed Type-I hypersensitivity which is caused by the residual extractable latex proteins present in natural rubber products.

Natural as well as artificially made polymer latices are commonly crosslinked using a sulfur vulcanization system including sulfur and sulfur-containing accelerators. The use of these sulfur vulcanization systems in rubber gloves manufacturing can give rise to the delay Type-IV hypersensitivity such as allergic contact dermatitis.

As a result, in the prior art several attempts were made to avoid sulfur vulcanization systems and particularly to provide polymer latices that can be used for the manufacture of dip-molded articles that do not need the standard sulfur vulcanization systems including the sulfur-containing accelerators previously used therein in order to obtain the desired mechanical properties of the final product.

U.S. Pat. No. 9,243,117 discloses a formulation for making an elastomeric rubber thin film without using sulfur and accelerators comprising a carboxylated acrylonitrile butadiene latex, a metal oxide, a pH adjuster to obtain a pH of 9 to 10, and water, wherein the water is added to provide a total solids concentration in the formulation between 18 and 30% and the carboxylated acrylonitrile butadiene latex is a self-crosslinked carboxylated acrylonitrile butadiene latex. The specification of the U.S. patent is silent with respect to what is meant by "self-crosslinked carboxylated acrylonitrile butadiene latex".

U.S. Pat. No. 7,345,111 relates to an acrylic polymer emulsion and gloves formed from this emulsion. The polymer is formed by polymerization of 100% by weight in total of a monomeric mixture comprising 50 to 90% by weight of an alkyl acrylate or an alkyl methacrylate, 9 to 49% by weight of a vinyl monomer, the homopolymer thereof has a glass transition temperature of not lower than 80° C., 0.2 to 100% by weight of a vinyl monomer having a carboxyl group, and 0.1 to 5% by weight of a crosslinkable monomer, which is poly(tetramethyleneether) glycol diglycidyl ether having a molecular weight of no less than 280.

U.S. Pat. No. 8,975,351 discloses a latex resin composition for rubber gloves without sulfur and vulcanization accelerators. The composition comprises a conjugated diene monomer, an ethylenically unsaturated nitrile monomer, an ethylenically unsaturated acid monomer, an ethylenically unsaturated monomer copolymerizable with the ethylenically unsaturated nitrile monomer and the ethylenically unsaturated acid monomer, and a reactive compound which includes two or more reactive groups. Examples of these compounds are polyether glycol diglycidyl ethers.

Similarly, U.S. Pat. No. 8,044,138 discloses a carboxylic acid-modified nitrile copolymer latex prepared from, as constituent monomers, a conjugated diene monomer, an ethylenically unsaturated nitrile monomer, an ethylenically unsaturated acid monomer, and an unsaturated monomer having at least one crosslinkable functional group selected from vinyl or epoxy groups. In the examples, glycidyl methacrylate is inter alia used as monomer having at least one crosslinkable functional group.

U.S. 2010/0093913 relates to latex compositions particularly suitable for coating applications comprising a blend of a conventional latex and a nanolatex, wherein either of the latices can be made from monomers that include functional groups for post-crosslinking. In a long list of possible monomers glycidyl methacrylate is mentioned, but not exemplified in the examples of that document. Furthermore, this prior art document is unrelated to dip-molding or the use of the therein disclosed latex for producing dip-molded articles.

Despite these prior art efforts, there is still a need in the industry for a polymer latex used for the manufacturing of dip-molded articles without the necessity to employ a sulfur vulcanization system including accelerators, whereby the desired mechanical properties can be achieved without sulfur vulcanization.

A further object of the present invention is to provide a polymer latex suitable for dip-molding applications that results in improved solvent resistance, as required for industrial glove applications.

A still further object of the present invention is to provide a polymer latex that results in a more economical production of dip-molded articles in terms of reduction of total process time and reduced energy consumption.

SUMMARY OF THE INVENTION

Surprisingly, the present inventors found that the above objects can be attained by a polymer latex for dip-molding applications comprising:
(a) particles of a carboxylated conjugated diene nitrile latex polymer (a) obtainable by free-radical emulsion polymerization of a mixture of ethylenically unsaturated monomers comprising:
  15 to 99 wt.-% of conjugated dienes;
  1 to 80 wt.-% of monomers selected from ethylenically unsaturated nitrile compounds;
  0.05 to 10 wt.-% of ethylenically unsaturated acids and/or salts thereof;
  0 to 50 wt.-% of vinyl aromatic monomers; and
  0 to 65 wt.-% of alkyl esters of ethylenically unsaturated acids,
  the weight percentages being based on the total monomers in the mixture in combination or association with (b) particles of a latex polymer (b) comprising at least one oxirane-functional group, wherein the monomer composition of the latex polymer (a) is different from the monomer composition of the latex polymer (b).

The combination or association of particles of said latex polymer (a) with particles of said latex polymer (b) can be achieved by, for example, one of the following measures:

(i) the mixture of ethylenically unsaturated monomers for latex polymer (a) is polymerized in presence of the oxirane-functional latex particles (b) in the free-radical emulsion polymerization;

(ii) a polymer latex comprising the particles of latex polymer (a) and a polymer latex comprising the particles of latex polymer (b) are preformed and subsequently both latices are combined; and (iii) the mixture of ethylenically unsaturated monomers for latex polymer (a) is polymerized in presence of the oxirane-functional latex particles (b) in the free-radical emulsion polymerization forming a first polymer latex, and a second polymer latex comprising the particles of latex polymer (b) is preformed and subsequently both latices are combined, wherein the latex comprising the oxirane-functional latex particles (b) present in the polymerization of the mixture of ethylenically unsaturated monomers for latex polymer (a) and the second polymer latex comprising the particles of latex polymer (b) are the same or are different.

The present invention also relates to a method for preparation of a polymer latex comprising:

(i) polymerizing in an emulsion polymerization process a mixture of ethylenically unsaturated monomers for latex polymer (a) comprising:
15 to 99 wt.-% of conjugated dienes;
1 to 80 wt.-% of monomers selected from ethylenically unsaturated nitrile compounds;
0.05 to 10 wt.-% of ethylenically unsaturated acids and/or salts thereof;
0 to 50 wt.-% of vinyl aromatic monomers; and
0 to 65 wt.-% of alkyl esters of ethylenically unsaturated acids,
the weight percentages being based on the total monomers employed in the emulsion polymerization in an aqueous medium in presence of a free-radical initiator, stabilizers and latex particles comprising particles of a latex polymer (b) comprising at least one oxirane-functional group; or (ii) (1) forming a latex polymer (a) by free-radical emulsion polymerization in an aqueous medium in presence of a free-radical initiator and stabilizers of a mixture of ethylenically unsaturated monomers comprising:
15 to 99 wt.-% of conjugated dienes;
1 to 80 wt.-% of monomers selected from ethylenically unsaturated nitrile compounds;
0.05 to 10 wt.-% of ethylenically unsaturated acids and/or salts thereof;
0 to 50 wt.-% of vinyl aromatic monomers; and
0 to 65 wt.-% of alkyl esters of ethylenically unsaturated acids,
the weight percentages being based on the total monomers employed in the emulsion polymerization;
(2) forming a latex polymer (b) comprising at least one oxirane-functional group; and
(3) combining latex polymer (a) and latex polymer (b); or (iii) (1) polymerizing in an emulsion polymerization process a mixture of ethylenically unsaturated monomers for latex polymer (a) comprising:
15 to 99 wt.-% of conjugated dienes;
1 to 80 wt.-% of monomers selected from ethylenically unsaturated nitrile compounds;
0.05 to 10 wt.-% of ethylenically unsaturated acids and/or salts thereof;
0 to 50 wt.-% of vinyl aromatic monomers; and
0 to 65 wt.-% of alkyl esters of ethylenically unsaturated acids,
the weight percentages being based on the total monomers employed in the emulsion polymerization in an aqueous medium in presence of a free-radical initiator, stabilizers and latex particles comprising particles of a latex polymer (b) comprising at least one oxirane-functional group
(2) forming a latex polymer (b) comprising at least one oxirane-functional group; and
(3) combining the latex of step (1) and the latex of step (2), wherein the latex polymer (b) comprising at least one oxirane-functional group in step (1) and step (2) are the same or are different; and wherein
the monomer composition of the latex polymer (a) is different from the monomer composition of the latex polymer (b).

The present invention further relates to the use of the above defined polymer latex for the production of dip-molded articles or for coating or impregnating a substrate, preferably a textile substrate.

The present invention further relates to a compounded latex composition suitable for the production of dip-molded articles comprising
the polymer latex as defined above and optionally adjuvants selected from sulfur vulcanization agents, accelerators for sulfur vulcanization, crosslinkers, polyvalent cations and combinations thereof; or
a preformed compounded polymer latex comprising the particles of latex polymer (a) as defined above and optionally adjuvants selected from sulfur vulcanization agents, accelerators for sulfur vulcanization, crosslinkers, polyvalent cations and combinations thereof and preformed particles of latex polymer (b) as defined above; or
a preformed compounded polymer latex comprising the particles of latex polymer (b) as defined above and optionally adjuvants selected from sulfur vulcanization agents, accelerators for sulfur vulcanization, crosslinkers, polyvalent cations and combinations thereof and preformed particles of latex polymer (a) as defined above.

As mentioned above, the polymer latex of the present invention can be successfully employed in dip-molding applications without sulfur vulcanization agents and accelerators for sulfur vulcanization without compromising the required mechanical properties. Thus, it is preferred that the compounded latex composition of the present invention is free of sulfur vulcanization agents and accelerators for sulfur vulcanization The present invention further relates to a method for making dip-molded articles by
a) providing a compounded latex according to the present invention;
b) immersing a mold having the desired shape of the final article in a coagulant bath comprising a solution of a metal salt;
c) removing the mold from the coagulant bath and optionally drying the mold;
d) immersing the mold as treated in step b) and c) in the compounded latex composition of step a);
e) coagulating a latex film on the surface of the mold;

f) removing the latex-coated mold from the compounded latex composition and optionally immersing the latex-coated mold in a water bath;
g) optionally drying the latex-coated mold;
h) heat treating the latex-coated mold obtained from step e) or f) at a temperature of 40° C. to 180° C.; and
i) removing the latex article from the mold.

The present invention also relates to an article made by using the polymer latex or the compounded latex composition according to the present invention.

DETAILED DESCRIPTION OF THE INVENTION

The present invention relates to a polymer latex for dip-molding applications comprising:
(a) particles of a carboxylated conjugated diene nitrile latex polymer (a) obtainable by free-radical emulsion polymerization of a mixture of ethylenically unsaturated monomers comprising:
  15 to 99 wt.-% of conjugated dienes;
  1 to 80 wt.-% of monomers selected from ethylenically unsaturated nitrile compounds;
  0.05 to 10 wt.-% of ethylenically unsaturated acids and/or salts thereof;
  0 to 50 wt.-% of vinyl aromatic monomers; and
  0 to 65 wt.-% of alkyl esters of ethylenically unsaturated acids,
  the weight percentages being based on the total monomers in the mixture in combination or association with
(b) particles of a latex polymer (b) comprising at least one oxirane-functional group; wherein the monomer composition of the latex polymer (a) is different from the monomer composition of the latex polymer (b).

The term "in combination or association" covers a latex wherein the latex polymer (a) and the latex polymer (b) are present as a physical mixture such as a blend of both latex polymers as well as a latex wherein the latex polymer (a) and the latex polymer (b) exhibit any kind of chemical or physical interaction between particles of latex polymer (a) and latex polymer (b). According to the present invention, combination or association of particles of said latex polymer (a) with particles of said latex polymer (b) can be achieved by for example one of the following measures:
(i) the mixture of ethylenically unsaturated monomers for latex polymer (a) is polymerized in presence of the oxirane-functional latex particles (b) in the free-radical emulsion polymerization;
(ii) a polymer latex comprising the particles of latex polymer (a) and a polymer latex comprising the particles of latex polymer (b) are preformed and subsequently both latices are combined; and
(iii) the mixture of ethylenically unsaturated monomers for latex polymer (a) is polymerized in presence of the oxirane-functional latex particles (b) in the free-radical emulsion polymerization forming a first polymer latex, and a second polymer latex comprising the particles of latex polymer (b) is preformed and subsequently both latices are combined, wherein the latex comprising the oxirane-functional latex particles (b) present in the polymerization of the mixture of ethylenically unsaturated monomers for latex polymer (a) and the second polymer latex comprising the particles of component (b) are the same or are different.

The term "the monomer composition of the latex polymer (a) is different from the monomer composition of the latex polymer (b)" encompasses that the monomers used for the preparation of latex polymer (a) are different from the monomers for the preparation of latex polymer (b) or that the monomers are the same but are used in different relative amounts when preparing latex polymer (a) and latex polymer (b).

The polymer latex of the present invention may comprise:
(a) particles of a carboxylated conjugated diene nitrile latex polymer (a) obtainable by free-radical emulsion polymerization of a mixture of ethylenically unsaturated monomers comprising:
  15 to 99 wt.-% of conjugated dienes;
  1 to 80 wt.-% of monomers selected from ethylenically unsaturated nitrile compounds;
  0.05 to 10 wt.-% of ethylenically unsaturated acids and/or salts thereof;
  0 to 50 wt.-% of vinyl aromatic monomers; and
  0 to 65 wt.-% of alkyl esters of ethylenically unsaturated acids,
  0 to 5 wt.-%, preferably 0 to 3 wt.-% of ethylenically unsaturated monomers bearing an oxirane functional group
  the weight percentages being based on the total monomers in the mixture for latex polymer a)
in combination or association with
(b) particles of a latex polymer (b) obtainable by free-radical emulsion polymerization of a mixture of ethylenically unsaturated monomers comprising more than 5 wt.-%, preferably at least 10 wt.-% more preferred at least 15 wt.-% of ethylenically unsaturated monomers bearing an oxirane functional group based on the total monomers in the mixture for latex polymer b).

Latex Polymer (b) Comprising at Least One Oxirane-Functional Group

The latex polymer (b) to be used according to the present invention can be prepared by any suitable free-radical emulsion polymerization process known in the art. Suitable process parameters are those that will be discussed below with respect to the emulsion polymerization process for the preparation of latex polymer (a).

The unsaturated monomers to be used for the preparation of the latex polymer (b) and their relative amounts are not particularly critical as long as the monomer mixture comprises at least one ethylenically unsaturated monomer bearing an oxirane-functional group. According to the present invention the oxirane-functional ethylenically unsaturated monomer may be monofunctional with respect to the oxirane functionality and does not contain an oligomeric or polymeric backbone. Particularly, the number average molecular weight of the oxirane-functional ethylenically unsaturated monomer is below 280 Dalton.

Suitable oxirane-functional ethylenically unsaturated monomers may be selected from glycidyl (meth)acrylate, allyl glycidylether, vinyl glycidylether, vinyl cyclohexene oxide, limonene oxide, 2-ethylglycidylacrylate, 2-ethylglycidylmethacrylate, 2-(n-propyl)glycidylacrylate, 2-(n-propyl)glycidylmethacrylate, 2-(n-butyl)glycidylacrylate, 2-(n-butyl)glycidylmethacrylate, glycidylmethylmethacrylate, glycidylacrylate, (3',4'-epoxyheptyl)-2-ethylacrylate, (3',4'-epoxyheptyl)-2-ethylmethacrylate, (6',7'-epoxyheptyl)acrylate, (6',7'-epoxyheptyl)methacrylate, allyl-3,4-epoxyheptylether, 6,7-epoxyheptylallylether, vinyl-3,4-epoxyheptylether, 3,4-epoxyheptylvinylether, 6,7-epoxyheptylvinylether, o-vinylbenzylglycidylether, m-vinylbenzylglycidylether, p-vinylbenzylglycidylether, 3-vinyl cyclohexene oxide, alpha-methyl glycidyl methacrylate, 3,4-epoxycyclohexylmethyl (meth)acrylate and combinations thereof. Glycidyl (meth)acrylate is particularly preferred.

The oxirane-functional latex polymer (b) according to the present invention may comprise structural units derived from ethylenically unsaturated oxirane-functional monomers in an amount of 1 to 80 wt.-%, preferably 20 to 70 wt.-%, more preferred 25 to 65 wt.-%, most preferred 35 to 65 wt.-%, based on the total weight of monomers for the oxirane-functional latex particles (b). Thus, the lower limit for the amount of ethylenically unsaturated oxirane-functional monomers may be 1 wt.-%, or 5 wt.-%, or 10 wt.-%, or 12 wt.-%, or 14 wt.-%, or 16 wt.-%, or 18 wt.-%, or 20 wt.-%, or 22 wt.-%, or 24 wt.-%, or 26 wt.-%, or 28 wt.-%, or 30 wt.-%, or 32 wt.-%, or 34 wt.-%, or 35 wt.-%, based on the total weight of monomers for the oxirane-functional latex particles (b). Accordingly, the upper limit for the amount of ethylenically unsaturated oxirane-functional monomers may be 80 wt.-%, or 75 wt.-%, or 73 wt.-%, or 70 wt.-%, or 68 wt.-%, or 65 wt.-%, or 62 wt.-%, or 60 wt.-%, or 58 wt.-%, or 56 wt.-%, or 54 wt.-%, or 52 wt.-%, or 50 wt.-%, based on the total weight of monomers for the oxirane-functional latex particles (b). A person skilled in the art will understand that any range formed by any of the explicitly disclosed lower limits and upper limits is explicitly encompassed in the present specification.

Suitable additional monomers for the preparation of the oxirane-functional latex polymer (b) according to the present invention can be selected from
ethylenically unsaturated nitrile compounds;
vinyl aromatic monomers;
alkyl esters of ethylenically unsaturated acids;
hydroxyalkyl esters of ethylenically unsaturated acids;
amides of ethylenically unsaturated acids;
ethylenically unsaturated acids;
ethylenically unsaturated sulfonic acid monomers and/or
ethylenically unsaturated phosphorous-containing acid monomers
vinyl carboxylates;
conjugated dienes;
monomers having at least two ethylenically unsaturated groups; and
combinations thereof.

Examples of ethylenically unsaturated nitrile monomers which can be used for the preparation of the oxirane-functional latex polymer (b) according to the present invention include polymerizable unsaturated aliphatic nitrile monomers which contain from 2 to 4 carbon atoms in a linear or branched arrangement, which may be substituted either by acetyl or additional nitrile groups. Such nitrile monomers include acrylonitrile, methacrylonitrile, alpha-cyanoethyl acrylonitrile, fumaronitrile and combinations thereof, with acrylonitrile being most preferred.

Representatives of vinyl-aromatic monomers include, for example, styrene, α-methylstyrene, p-methylstyrene, t-butylstyrene and vinyltoluene. Preferably, the vinyl-aromatic monomers are selected from styrene, alpha-methyl styrene and combinations thereof.

Esters of (meth)acrylic acid that can be used to prepare the oxirane-functional latex particles (b) according to the present invention include n-alkyl esters, iso-alkyl esters or tert-alkyl esters of acrylic or (meth)acrylic acid in which the alkyl group has from 1 to 20 carbon atoms, the reaction product of methacrylic acid with glycidyl ester of a neoacid such as versatic acid, neodecanoic acid or pivalic acid and hydroxyalkyl (meth)acrylate and alkoxyalkyl (meth)acrylate monomers.

In general, the preferred alkyl esters of (meth)acrylic acids may be selected from $C_1$-$C_{20}$ alkyl (meth)acrylate, preferably $C_1$-$C_{10}$-alkyl (meth)acrylates. Examples of such acrylate monomers include n-butyl acrylate, secondary butyl acrylate, methyl acrylate, ethyl acrylate, hexyl acrylate, tert-butyl acrylate, 2-ethyl-hexyl acrylate, isooctyl acrylate, 4-methyl-2-pentyl acrylate, 2-methylbutyl acrylate, methyl methacrylate, butyl methacrylate, n-butyl methacrylate, isobutyl methacrylate, ethyl methacrylate, isopropyl methacrylate, hexyl methacrylate, cyclohexyl methacrylate and cetyl methacrylate. It is particularly preferred to select the esters of (meth)acrylic acids from methyl (meth)acrylate, ethyl (meth)acrylate, propyl (meth)acrylate, butyl (meth)acrylate, 2-ethylhexyl (meth)acrylate and combinations thereof.

The hydroxy alkyl(meth)acrylate monomers which can be used to prepare the oxirane-functional latex polymer (b) according to the present invention include hydroxyalkyl acrylate and methacrylate monomers which are based on ethylene oxide, propylene oxide and higher alkylene oxides or mixtures thereof. Examples are hydroxyethyl acrylate, hydroxypropyl acrylate, hydroxyethyl methacrylate, hydroxypropyl methacrylate and hydroxybutyl acrylate. Preferably, the hydroxy alkyl(meth)acrylate monomer is selected from 2-hydroxy ethyl (meth)acrylate.

Amides of ethylenically unsaturated acids that can be used for the preparation of the oxirane-functional latex polymer (b) according to the present invention include acrylamide, methacrylamide, and diacetone acrylamide. The preferred amide monomer is (meth)acrylamide.

Vinyl ester monomers which can be used to prepare the oxirane-functional latex polymer (b) according to the present invention include vinyl acetate, vinyl proprionate, vinyl butyrate, vinyl benzoate, vinyl-2-ethylhexanoate, vinyl stearate, and the vinyl esters of versatic acid. The most preferred vinyl ester is vinyl acetate.

The ethylenically unsaturated carboxylic acid monomers suitable for the preparation of the oxirane-functional latex polymer (b) according to the present invention include monocarboxylic acid and dicarboxylic acid monomers and monoesters of dicarboxylic acid. Carrying out the present invention, it is preferable to use ethylenically unsaturated aliphatic mono- or dicarboxylic acids or anhydrides which contain from 3 to 5 carbon atoms. Examples of monocarboxylic acid monomers include acrylic acid, methacrylic acid, crotonic acid and examples of dicarboxylic acid monomers include fumaric acid, itaconic acid, maleic acid and maleic anhydride. Examples of other suitable ethylenically unsaturated acids include vinyl acetic acid, vinyl lactic acid, vinyl sulfonic acid, 2-methyl-2-propene-1-sulfonic acid, styrene suffonic acid, acrylamidomethyl propane sulfonic acid and the salts thereof. Preferably, the ethylenically unsaturated carboxylic acid monomers are selected from (meth)acrylic acid, crotonic acid, itaconic acid, maleic acid, fumaric acid and combinations thereof.

Conjugated diene monomers suitable for the preparation of the oxirane-functional latex polymer (b) according to the present invention include conjugated diene monomers, selected from 1,3-butadiene, isoprene, 2,3-dimethyl-1,3-butadiene, 2,3-dimethyl-1,3-butadiene, 2-chloro-1,3-butadiene, 1,3-pentadiene, 1,3-hexadiene, 2,4-hexadiene, 1,3-octadiene, 2-methyl-1,3-pentadiene, 2,3-dimethyl-1,3-pentadiene, 3,4-dimethyl-1,3-hexadiene, 2,3-diethyl-1,3-butadiene, 4,5-diethyl-1,3-octadiene, 3-butyl-1,3-octadiene, 3,7-dimethyl-1,3,6-octatriene, 2-methyl-6-methylene-1,7-octadiene, 7-methyl-3-methylene-1,6-octadiene, 1,3,7-octatriene, 2-ethyl-1, 3-butadiene, 2-amyl-1,3-butadiene, 3, 7-dimethyl-1,3,7-octatriene, 3,7-dimethyl-1,3,6-octatriene, 3,7,11-trimethyl-1,3,6,10-dodecatetraene, 7,11-dimethyl-3-methylene-1,6,10-dodecatriene, 2,6-dimethyl-2,4,6-octatriene, 2-phenyl-1,3-butadiene and 2-methyl-3-isopropyl-1,3-butadiene and 1,3-cyclohexadiene. 1,3-Butadiene, isoprene and combinations thereof are the preferred conjugated dienes.

Furthermore, monomers having at least two ethylenically unsaturated groups can be used in the preparation of the oxirane-functional latex polymer (b). Suitable bifunctional monomers which are capable of providing internal cross-linking and branching in the polymer (herein known as multifunctional monomers), may be selected from divinyl benzene and diacrylates and di(meth)acrylates. Examples are ethylene glycol di(meth)acrylate, hexanediol di(meth) acrylate, tripropylene glycol di(meth) acrylate, butanediol di(meth)acrylate, neopentyl glycol di(meth)acrylate, diethylene glycol di(meth)acrylate, triethylene glycol di(meth) acrylate, and dipropylene glycol di(meth)acrylate. The monomers having at least two ethylenically unsaturated groups are preferably selected from divinyl benzene 1,2-ethyleneglycol di(meth)acrylate, 1,4-butanediol di(meth) acrylate and 1,6-hexanediol di(meth)acrylate.

The oxirane-functional latex polymer (b) according to the present invention may comprise structural units derived from
- 0 to 50 wt.-%, preferably 0 to 30 wt.-%, more preferred 0 to 20 wt.-%, of monomers selected from ethylenically unsaturated nitrile compounds, preferably acrylonitrile;
- 0 to 95 wt.-%, preferably 0 to 70 wt.-%, more preferred 0 to 50 wt.-% of vinyl aromatic monomers, preferably styrene;
- 0 to 95 wt.-%, preferably 5 to 95 wt.-%, more preferred 20 to 95 wt.-% of $C_1$ to $C_8$ alkyl (meth)acrylates;
- 0 to 10 wt.-%, preferably 0 to 7 wt.-%, more preferred 0.01 to 7 wt.-% of ethylenically unsaturated acids, preferably (meth)acrylic acid;
- 0 to 10 wt.-%, preferably 0 to 8 wt.-%, more preferred 0 to 6 wt.-% of ethylenically unsaturated compounds bearing silane, sulfonate, sulfonic acid, phosphate, amide and/or N-methylolamide groups;
- 0 to 50 wt.-%, preferably 0 to 40 wt.-%, more preferred 0 to 20 wt.-% of vinyl carboxylates, preferably vinyl acetate;
- 1 to 80 wt.-%, preferably 20 to 70 wt.-%, more preferred 25 to 65 wt.-%, most preferred 35 to 65 wt.-% of structural units derived from ethylenically unsaturated oxirane-functional monomers.

Alternatively, the oxirane-functional latex polymer (b) according to the present invention may comprise structural units derived from
- 2 to 95 wt.-%, preferably 10 to 95 wt.-%, more preferred 20 to 95 wt.-% of conjugated dienes, preferably selected from butadiene, isoprene and combinations thereof, more preferred butadiene;
- 1 to 50 wt.-%, preferably 5 to 50 wt.-%, more preferred 5 to 40 wt.-% of monomers selected from ethylenically unsaturated nitrile compounds, preferably acrylonitrile;
- 0 to 95 wt.-%, preferably 0 to 90 wt.-%, more preferred 0 to 70 wt.-%, of vinyl aromatic monomers, preferably styrene;
- 0 to 95 wt.-%, preferably 0 to 90 wt.-%, more preferred 0 to 70 wt.-% of $C_1$ to $C_8$ alkyl (meth)acrylates;
- 0 to 10 wt.-%, preferably 0 to 8 wt.-%, more preferred 0 to 7 wt.-% of ethylenically unsaturated acids, preferably (meth)acrylic acid;
- 0 to 10 wt.-%, preferably 0 to 8 wt.-%, more preferred 0 to 6 wt.-% of ethylenically unsaturated compounds bearing silane, sulfonate, sulfonic acid, phosphate, amide and/or N-methylolamide groups,
- 1 to 80 wt.-%, preferably 20 to 70 wt.-%, more preferred 25 to 65 wt.-%, most preferred 35 to 65 wt.-% of structural units derived from ethylenically unsaturated oxirane-functional monomers.

According to the present invention, the amounts of the above-defined monomers for the preparation of latex polymer (b) may add up to 100 wt.-%

The glass transition temperature (mid point temperature Tmg) of the oxirane-functional latex polymer (b) according to the present invention may be −50° to 50° C. as measured by DSC according to ASTM D3418-03, preferably −40° C. to 40° C., more preferably −30° C. to 30° C., more preferred −25° C. to 25° C. and most preferred −22° C. to 22° C. Thus, the lower limit of the Tmg range may be −50, −45, −40, −38, −36, −34, −32, −30, −29, −28, −27, −26, −25, −24, −23, or −22° C. The upper limit of the Tmg range may be 50, 45, 40, 38, 36, 34, 32, 30, 29, 28, 27, 26, 25, 24, 23, or 22° C. A person skilled in the art will understand that any range formed by any of the explicitly disclosed lower limits and upper limits is explicitly encompassed in the present specification.

The z-average particle size measured with a Malvern zetasizer nano S (ZEN 1600) using dynamic light scattering (DLS) of the oxirane-functional latex particles (b) according to the present invention, irrespective of whether it is employed as latex, added during the polymerization of latex polymer (a) or as preformed latex blended with the latex polymer (a), is preferably 5 to 90 nm, more preferably 15 to 85 nm, more preferred 20 to 80 nm. The lower limit of the z-average particle size therefore can be 5 nm, 7 nm, 8 nm, 9 nm, 10 nm, 11 nm, 12 nm, 13 nm, 14 nm, 15 nm, 16 nm, 17 nm, 18 nm, 19 nm, or 20 nm, whereas the upper limit can be 90 nm, 85 nm, 80 nm, 75 nm, 70 nm, 65 nm, 60 nm, 55 nm, 50 nm, 45 nm, 40 nm, 38 nm, 36 nm, 34 nm, 32 nm, or 30 nm. A person skilled in the art will understand that any range formed by any of the explicitly disclosed lower limits and upper limits is explicitly encompassed in the present specification.

A person skilled in the art will appreciate that the oxirane-functional latex polymer (b) of the present invention can be used as particles (for example as seed particles) present in the emulsion polymerization of the latex polymer (a) or can be blended with a preformed latex polymer (a) whereby the preformed latex polymer (a) can be made by emulsion polymerization with or without oxirane-functional latex polymer (b) according to the present invention as particles present in the emulsion polymerization for example as seed particles. The person skilled in the art will also appreciate that the oxirane-functional latex particles (b) used as particles present in the emulsion polymerization of the preformed latex polymer (a) and the oxirane-functional latex polymer (b) blended with the preformed latex polymer (a) may be the same or different.

Latex Polymer (a)

According to the present invention the mixture of ethylenically unsaturated monomers for preparing the latex polymer (a) comprises
- 15 to 99 wt.-% of conjugated dienes;
- 1 to 80 wt.-% of monomers selected from ethylenically unsaturated nitrile compounds;
- 0.05 to 10 wt.-% of ethylenically unsaturated acids and/or salts thereof;
- 0 to 50 wt.-% of vinyl aromatic monomers; and 0 to 65 wt.-% of alkyl esters of ethylenically unsaturated acids, the weight percentages being based on the total monomers employed in the emulsion polymerization.

In the mixture of ethylenically unsaturated monomers additional ethylenically unsaturated monomers may be present, that are selected from hydroxyalkyl esters of ethylenically unsaturated acids;
amides of ethylenically unsaturated acids;
vinyl carboxylates;
monomers having at least two ethylenically unsaturated groups;
ethylenically unsaturated silanes;
oxirane functional ethylenically unsaturated compounds; and
combinations thereof.

According to the present invention the mixture of ethylenically unsaturated monomers for preparing the latex polymer (a) may be free of oxirane functional monomers.

Conjugated diene monomers suitable for the preparation of latex polymer (a) according to the present invention include conjugated diene monomers, selected from 1,3-butadiene, isoprene, 2,3-dimethyl-1,3-butadiene, 2,3-dimethyl-1,3-butadiene, 2-chloro-1,3-butadiene, 1,3-pentadiene, 1,3-hexadiene, 2,4-hexadiene, 1,3-octadiene, 2-methyl-1,3-pentadiene, 2,3-dimethyl-1,3-pentadiene, 3,4-dimethyl-1,3-hexadiene, 2,3-diethyl-1,3-butadiene, 4,5-diethyl-1,3-octadiene, 3-butyl-1,3-octadiene, 3,7-dimethyl-1,3,6-octatriene, 2-methyl-6-methylene-1,7-octadiene, 7-methyl-3-methylene-1,6-octadiene, 1,3,7-octatriene, 2-ethyl-1,3-butadiene, 2-amyl-1,3-butadiene, 3,7-dimethyl-1,3,7-octatriene, 3,7-dimethyl-1,3,6-octatriene, 3,7,11-trimethyl-1,3,6,10-dodecatetraene, 7,11-dimethyl-3-methylene-1,6,10-dodecatriene, 2,6-dimethyl-2,4,6-octatriene, 2-phenyl-1,3-butadiene and 2-methyl-3-isopropyl-1,3-butadiene and 1,3-cyclohexadiene. 1,3-Butadiene, isoprene and combinations thereof are the preferred conjugated dienes. 1,3-Butadiene is the most preferred diene. Typically, the amount of conjugated diene monomer ranges from 15 to 99 wt.-%, preferably from 20 to 99 wt.-%, more preferred from 30 to 75 wt.-%, most preferred from 40 to 70 wt.-%, based on the total weight of monomers. Thus, the conjugated diene may be present in amounts of at least 15 wt.-%, at least 20 wt.-%, at least 22 wt.-%, at least 24 wt.-%, at least 26 wt.-%, at least 28 wt.-%, at least 30 wt.-%, at least 32 wt.-%, at least 34 wt.-%, at least 36 wt.-%, at least 38 wt.-%, or at least 40 wt.-%, based on the total weight of the ethylenically unsaturated monomers for latex polymer (a).

Accordingly, the conjugated diene monomers can be used in amounts of no more than 95 wt.-%, no more than 90 wt.-%, no more than 85 wt.-%, no more than 80 wt.-%, no more than 78 wt.-%, no more than 76 wt.-%, no more than 74 wt.-%, no more than 72 wt.-%, no more than 70 wt.-%, no more than 68 wt.-%, no more than 66 wt.-%, no more than 64 wt.-%, no more than 62 wt.-%, no more than 60 wt.-%, no more than 58 wt.-%, or no more than 56 wt.-%. A person skilled in the art will appreciate that any range between any of the explicitly disclosed lower and upper limit is herein disclosed.

Unsaturated nitrile monomers which can be used in the present invention include polymerizable unsaturated aliphatic nitrile monomers which contain from 2 to 4 carbon atoms in a linear or branched arrangement, which may be substituted either by acetyl or additional nitrile groups. Such nitrile monomers include acrylonitrile, methacrylonitrile, alpha-cyanoethyl acrylonitrile, fumaronitrile and combinations thereof, with acrylonitrile being most preferred. These nitrile monomers can be included in amounts from 1 to 80 wt.-%, preferably from 10 to 70 wt.-%, or 1 to 60 wt.-%, and more preferred from 15 to 50 wt.-%, even more preferred from 20 to 50 wt.-%, most preferred from 23 to 43 wt.-%, based on the total weight of ethylenically unsaturated monomers for latex polymer (a).

Thus, the unsaturated nitrile may be present in amounts of at least 1 wt.-%, 5 wt.-%, at least 10 wt.-%, at least 12 wt.-%, at least 14 wt.-%, at least 16 wt.-%, at least 18 wt.-%, at least 20 wt.-%, at least 22 wt.-%, at least 24 wt.-%, at least 26 wt.-%, at least 28 wt.-%, at least 30 wt.-%, at least 32 wt.-%, at least 34 wt.-%, at least 36 wt.-%, at least 38 wt.-%, or at least 40 wt.-%, based on the total weight of the ethylenically unsaturated monomers for latex polymer (a).

Accordingly, the unsaturated nitrile monomers can be used in amounts of no more than 80 wt.-%, no more than 75 wt.-%, no more than 73 wt.-%, no more than 70 wt.-%, no more than 68 wt.-%, no more than 66 wt.-%, no more than 64 wt.-%, no more than 62 wt.-%, no more than 60 wt.-%, no more than 58 wt.-%, no more than 56 wt.-%, no more than 54 wt.-%, no more than 52 wt.-%, no more than 50 wt.-%, no more than 48 wt.-%, no more than 46 wt.-%, or no more than 44 wt.-%. A person skilled in the art will appreciate that any range between any of the explicitly disclosed lower and upper limit is herein disclosed.

The ethylenically unsaturated acids or salts thereof may be selected from ethylenically unsaturated carboxylic acid monomers, ethylenically unsaturated sulfonic acid monomers, ethylenically unsaturated phosphorous-containing acid monomers. The ethylenically unsaturated carboxylic acid monomers suitable for use in the present invention include monocarboxylic acid and dicarboxylic acid monomers and monoesters of dicarboxylic acid. Carrying out the present invention, it is preferable to use ethylenically unsaturated aliphatic mono- or dicarboxylic acids or anhydrides which contain from 3 to 5 carbon atoms. Examples of monocarboxylic acid monomers include acrylic acid, methacrylic acid, crotonic acid and examples of dicarboxylic acid monomers include fumaric acid, itaconic acid, maleic acid and maleic anhydride. Examples of other suitable ethylenically unsaturated acids include vinyl acetic acid, vinyl lactic acid, vinyl sulfonic acid, 2-methyl-2-propene-1-sulfonic acid, styrene sulfonic acid, acrylamidomethyl propane sulfonic acid and the salts thereof. (Meth)acrylic acid, crotonic acid, itaconic acid, maleic acid, fumaric acid and combinations thereof are particularly preferred.

Examples of ethylenically unsaturated sulfonic acid monomers: vinylsulfonic acid, phenyl vinylsulfonate, sodium 4-vinylbenzenesulfonate, 2-methyl-2-propene-1-sulfonic acid, 4-styrenesulfonic acid, 3-allyloxy-2-hydroxy-1-propanesulfonic acid, 2-acrylamido-2-methyl-1-propane-sulfonic acid and the salts thereof.

Examples of ethylenically unsaturated phosphorus-containing acid monomers: vinylphosphonic acid, dimethyl vinylphosphonate, diethyl vinylphosphonate, diethyl allylphosphonate, allylphosphonic acid and the salts thereof.

The use of ethylenically unsaturated acid monomers influences the properties of the polymer dispersion and of the coating produced thereof. The type and the amount of these monomers are determined thereby. Typically, such an amount is from 0.05 to 10 wt.-%, particularly from 0.1 to 10 wt.-% or 0.05 to 7 wt.-%, preferably from 0.1 to 9 wt.-%, more preferred from 0.1 to 8 wt.-%, even more preferred from 1 to 7 wt.-%, most preferred 2 to 7 wt.-%, based on the total weight of the ethylenically unsaturated monomers for latex polymer (a). Thus, the ethylenically unsaturated acid monomers may be present in amounts of at least 0.01 wt.-%, at least 0.05 wt.-%, at least 0.1 wt.-%, at least 0.3 wt.-%, at least 0.5 wt.-%, at least 0.7 wt.-%, at least 0.9 wt.-%, at least 1 wt.-%, at least 1.2 wt.-%, at least 1.4 wt.-%, at least 1.6 wt.-%, at least 1.8 wt.-%, at least 2 wt.-%, at least 2.5 wt.-%, or at least 3 wt.-%. Likewise, the ethylenically unsaturated acid monomers may be present in amounts of no more than 10 wt.-%, no more than 9.5 wt.-%, no more than 9 wt.-%, no more than 8.5 wt.-%, no more than 8 wt.-%, no more than 7.5 wt.-%, no more than 7 wt.-%, no more than 6.5 wt.-%, no more than 6 wt.-%, no more than 5.5 wt.-%, or no more than 5 wt.-%, based on the total weight of ethylenically unsaturated monomers for latex polymer (a). A person skilled in the art will appreciate that any range defined by an explicitly disclosed lower limit and an explicitly disclosed upper limit is disclosed herewith.

Representatives of vinyl-aromatic monomers include, for example, styrene, α-methylstyrene, vinyltoluene, o-methylstyrene, p-methylstyrene, p-tert-butylstyrene, 2,4-dimethylstyrene, 2-methylstyrene, 3-methylstyrene, 4-methylstyrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene, vinylnaphthalene, vinyltoluene and vinylxylene, 2-vinylpyridine, 4-vinylpyridine and 1,1-diphenylethylenes and substituted 1,1-diphenylethylenes, 1,2-diphenylethene and substituted 1,2-diphenylethylenes. Mixtures of one or more of the vinyl-aromatic compounds may also be used. The preferred monomers are styrene and α-methylstyrene. The vinyl-aromatic compounds can be used in a range of from 0 to 50 wt.-%, preferably from 0 to 40 wt.-% more preferred from 0 to 25 wt.-%, even more preferred from 0 to 15 wt.-%, and most preferred from 0 to 10 wt.-%, based on the total weight of ethylenically unsaturated monomers for latex polymer (a). Thus, the vinyl-aromatic compound can be present in an amount of no more than 35 wt.-%, no more than 30 wt.-%, no more than 25 wt.-%, no more than 20 wt.-%, no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (a). Vinyl-aromatic compounds may also be completely absent.

Further, the mixture of ethylenically unsaturated monomers for latex polymer (a) according to the present invention may include additional ethylenically unsaturated monomers that are different from the above-defined monomers. These monomers may be selected from esters of (meth)acrylic acid, vinyl esters, and amides of ethylenically unsaturated acids or ethylenically unsaturated silane compounds.

Vinyl ester monomers which can be used according to the present invention include vinyl acetate, vinyl proprionate, vinyl butyrate, vinyl benzoate, vinyl-2-ethylhexanoate, vinyl stearate, and the vinyl esters of versatic acid. The most preferred vinyl ester monomer for use in the present invention is vinyl acetate. Typically, the vinyl ester monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (a).

Examples of suitable ethylenically unsaturated silane compounds can be selected from triethoxy(vinyl)silane and 3-methacryloxypropyltrimethoxysilane. The ethylenically unsaturated silane compounds can be present in an amount of 0.05 to 5.0 wt.-%, preferably 0.3 to 2.0 wt.-%, more preferred 0.3 to 1.0 wt.-%, based on the total weight of ethylenically unsaturated monomers for latex polymer (a).

Esters of (meth)acrylic acid that can be used according to the present invention include n-alkyl esters, iso-alkyl esters or tert-alkyl esters of acrylic or (meth)acrylic acid in which the alkyl group has from 1 to 20 carbon atoms, the reaction product of methacrylic acid with glycidyl ester of a neoacid such as versatic acid, neodecanoic acid or pivalic acid and hydroxyalkyl (meth)acrylate and alkoxyalkyl (meth)acrylate monomers.

In general, the preferred alkyl esters of (meth)acrylic acids may be selected from $C_1$-$C_{10}$ alkyl (meth)acrylate, preferably $C_1$-$C_8$-alkyl (meth)acrylates. Examples of such acrylate monomers include n-butyl acrylate, secondary butyl acrylate, ethyl acrylate, hexyl acrylate, tert-butyl acrylate, 2-ethyl-hexyl acrylate, isooctyl acrylate, 4-methyl-2-pentyl acrylate, 2-methylbutyl acrylate, methyl methacrylate, butyl methacrylate, n-butyl methacrylate, isobutyl methacrylate, ethyl methacrylate, isopropyl methacrylate, hexyl methacrylate, cyclohexyl methacrylate and cetyl methacrylate. Methyl (meth)acrylate, ethyl (meth)acrylate, propyl (meth) acrylate, butyl (meth)acrylate, 2-ethylhexyl (meth)acrylate and combinations thereof are preferred.

Typically, the alkyl (meth)acrylate monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (a).

The hydroxy alkyl(meth)acrylate monomers which can be used to prepare the polymer latex according to the present invention include hydroxyalkyl acrylate and methacrylate monomers which are based on ethylene oxide, propylene oxide and higher alkylene oxides or mixtures thereof. Examples are hydroxyethyl acrylate, hydroxypropyl acrylate, hydroxyethyl methacrylate, hydroxypropyl methacrylate and hydroxybutyl acrylate. Preferably, the hydroxy alkyl(meth)acrylate monomer is 2-hydroxy ethyl(meth) acrylate. Typically, hydroxy alkyl (meth)acrylate monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (a).

Alkoxyalkyl (meth)acrylate monomers which can be used in the present invention include methoxyethyl methacrylate, ethoxyethyl methacrylate, methoxyethyl methacrylate, ethoxyethyl acrylate, butoxyethyl methacrylate, methoxybutyl acrylate and methoxyethoxyethyl acrylate. Preferred alkoxyalkyl(meth)acrylate monomers are ethoxyethyl acrylate and methoxyethyl acrylate. Typically, the amount of alkoxyethyl alkyl (meth)acrylate monomers can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (a).

Amides of ethylenically unsaturated acids that can be used for the preparation of the polymer latex according to the present invention include acrylamide, methacrylamide, and diacetone acrylamide. The preferred amide monomer is (meth)acrylamide. In order to introduce functional groups that are capable of self-crosslinking upon heat treatment into the polymer particles of the present invention monomers comprising N-methylol amide groups may be employed. Suitable monomers are N-methylol (meth)acrylamide, N-methoxymethyl-(meth)acrylamide, N-n-butoxy-methyl-(meth)acrylamide, N-iso-butoxy-methyl-(meth)acrylamide, N-acetoxymethyl-(meth)acrylamide, N(-2,2-dimethoxy-1-hydroxyethyl) acrylamide. Typically, amides of ethylenically unsaturated acid can be present in an amount of no more than 18 wt.-%, no more than 16 wt.-%, no more than 14 wt.-%, no more than 12 wt.-%, no more than 10 wt.-%, no more than 8 wt.-%, no more than 6 wt.-%, no more than 4 wt.-%, no more than 2 wt.-%, or no more than 1 wt.-%, based on the total weight of ethylenically unsaturated monomers for latex polymer (a).

Furthermore, monomers having at least two ethylenically unsaturated groups can be present in the monomer mixture for the preparation of the polymer latex of the present invention in an amount 0 to 6.0 wt.-%, preferably 0.1 to 3.5 wt.-%, based on the total weight of ethylenically unsaturated monomers. Typically these monomers can be present in an amount of no more than 6 wt.-%, no more than 4 wt.-%, no more than 2 wt.-%, no more than 1 wt.-%, based on the total weight of ethylenically unsaturated monomers. Suitable bifunctional monomers which are capable of providing internal crosslinking and branching in the polymer (herein known as multifunctional monomers) may be selected from divinyl benzene and diacrylates and di(meth)acrylates. Examples are ethylene glycol di(meth)acrylate, hexanediol di(meth)acrylate, tripropylene glycol di(meth)acrylate, butanediol di(meth)acrylate, neopentyl glycol di(meth)acrylate, diethylene glycol di(meth)acrylate, triethylene glycol di(meth)acrylate, and dipropylene glycol di(meth)acrylate. The monomers having at least two ethylenically unsaturated groups are preferably selected from divinyl benzene, 1,2 ethyleneglycol di(meth)acrylate, 1,4-butanediol di(meth) acrylate and 1,6-hexanediol di(meth)acrylate.

Suitable oxirane functional monomers to be used in the preparation of latex polymer (a) are those as described above for the oxirane functional latex polymer (b) including the preferred embodiments. If employed, the oxirane functional monomers are preferably present in an amount oft 5 wt.-% at most, more preferred 3 wt.-% at most based on the total amount of monomers to be used in the preparation of latex polymer (a). But as mentioned above it is most preferred that latex polymer (a) is free of oxirane functional groups.

The mixture of the ethylenically unsaturated monomers for latex polymer (a) may comprise from:
20 to 99 wt.-% of conjugated dienes, preferably selected from butadiene, isoprene and combinations thereof, more preferred butadiene;
1 to 60 wt.-% of monomers selected from ethylenically unsaturated nitrile compounds, preferably acrylonitrile;
0 to 40 wt.-% of vinyl aromatic monomers, preferably styrene;
0 to 25 wt.-% of $C_1$ to $C_8$ alkyl (meth)acrylates;
0.05 to 7 wt.-% of ethylenically unsaturated acids, preferably (meth)acrylic acid;
0 to 10 wt.-% of vinyl esters;
0 to 10 wt.-% of ethylenically unsaturated compounds bearing silane, amide and/or N-methylolamide groups, the weight percentages being based on the total monomers present in the mixture.

According to the present invention, the amounts of the above-defined monomers for the preparation of latex polymer (a) may add up to 100 wt.-%

According to the present invention, the mixture of ethylenically unsaturated monomers to be polymerized in the free-radical emulsion polymerization may also comprise:
(a) 15 to 90 wt.-% of isoprene;
(b) 1 to 80 wt.-% of acrylonitrile;
(c) 0.01 to 10 wt.-%, preferably 0.05 to 10 wt.-% of at least one ethylenically unsaturated acid;
(d) 0 to 40 wt.-% of at least one aromatic vinyl compound, and
(e) 0 to 20 wt.-% of at least one further ethylenically unsaturated compound different from any of compounds (a) to (d). The ranges for component (a) and/or (b) may be selected from the ranges for (a) conjugated dienes and (b) unsaturated nitrile as disclosed above. Likewise, specific embodiments and amounts for the components (c), (d) and/or (e) may be selected from those as described above for components (c), (d) and the additional polymers.

The z-average particle size measured with a Malvern zetasizer nano S (ZEN 1600) using dynamic light scattering (DLS) of the latex particles (a) according to the present invention is preferably 70 to 1000 nm, more preferably 80 to 1000 nm, more preferably 90 to 1000 nm, 100 to 1000 nm, more preferably 110 to 600 nm, more preferred 120 to 500 nm. The lower limit of the z-average particle size of the latex particles (a) therefore can be 70 nm, 80 nm, 90 nm, 100 nm, 105 nm or 110 nm, or 120 nm; the upper limit for the z-average average particle size can be 900 nm, 800 nm, 700 nm, 600 nm, 500 nm, 400 nm, 350 nm, 300 nm, 270 nm, 250 nm, 230 nm, 210 nm or 200 nm. A person skilled in the art will understand that any range formed by any of the explicitly disclosed lower limits and upper limits is explicitly encompassed in the present specification.

According to the present invention it is particularly preferred that the z-average particle size of the latex polymer (a) is larger than the z-average particle size of the latex polymer (b), Method for the Preparation of the Polymer Latex of the Present Invention:

The latex polymer (a) according to the present invention can be made by any emulsion polymerization process known to a person skilled in the art, provided that the monomer mixture as herein defined is employed. Particularly suitable is the process as described in EP-A 792 891.

In the emulsion polymerization for preparing the latex polymer (a) of the present invention a seed latex may be employed. Preferably, the seed latex is the latex polymer (b) as described above including all disclosed variations. Alternatively, any other seed particles as known to the person skilled in the art can be used. But if no latex polymer (b) is used as seed particles, the particles of latex polymer (b) will have to be incorporated in the polymer latex of the present invention in any other suitable way like mixing a preformed latex comprising particles of latex polymer (a) with a preformed latex comprising particles of latex polymer (b).

The seed latex particles are preferably present in an amount of 0.01 to 10, preferably 1 to 5 parts by weight, based on 100 parts by weight of total ethylenically unsaturated monomers employed in the polymer latex including those for making the seed particles, such as the oxirane-functional latex particles (b). The lower limit of the amount of seed latex particles therefore can be 0.01, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, or 2.5 parts by weight. The upper limit of the amount can be 10, 9, 8, 7, 6, 5.5, 5, 4.5, 4, 3.8, 3.6, 3.4, 3.3, 3.2, 3.1 or 3 parts by weight. A person skilled in the art will understand that any range formed by any of the explicitly disclosed lower limits and upper limits is explicitly encompassed in the present specification.

The process for the preparation of the above-described polymer latex can be performed at temperatures of from 0 to 130° C., preferably of from 0 to 100° C., particularly preferably of from 5 to 70° C., very particularly preferably of from 5 to 60° C., in the presence of no or one or more emulsifiers, no or one or more colloids and one or more initiators. The temperature includes all values and sub-values therebetween, especially including 5, 10, 15, 20, 25, 30, 35, 40, 45, 50, 55, 60, 65, 70, 75, 80, 85, 90, 95, 100, 105, 110, 115, 120 and 125° C.

Initiators which can be used when carrying out the present invention include water-soluble and/or oil-soluble initiators which are effective for the purposes of the polymerization. Representative initiators are well known in the technical area and include, for example: azo compounds (such as, for example, AIBN, AMBN and cyanovaleric acid) and inorganic peroxy compounds, such as hydrogen peroxide, sodium, potassium and ammonium peroxydisulfate, peroxycarbonates and peroxyborates, as well as organic peroxy compounds, such as alkyl hydroperoxides, dialkyl peroxides, acyl hydroperoxides, and diacyl peroxides, as well as esters, such as tertiary butyl perbenzoate and combinations of inorganic and organic initiators.

The initiator is used in a sufficient amount to initiate the polymerization reaction at a desired rate. In general, an amount of initiator of from 0.01 to 5, preferably of from 0.1 to 4%, by weight, based on the weight of the total polymer, is sufficient. The amount of initiator is most preferably of from 0.01 to 2% by weight, based on the total weight of the polymer. The amount of initiator includes all values and sub-values therebetween, especially including 0.01, 0.1, 0.5, 1, 1.5, 2, 2.5, 3, 4 and 4.5% by weight, based on the total weight of the polymer.

The above-mentioned inorganic and organic peroxy compounds may also be used alone or in combination with one or more suitable reducing agents, as is well known in the art. Examples of such reducing agents which may be mentioned are sulfur dioxide, alkali metal disulfites, alkali metal and ammonium hydrogen sulfites, thiosulfates, dithionites and formaldehyde sulfoxylates, as well as hydroxylamine hydrochloride, hydrazine sulfate, iron (II) sulfate, cuprous naphthanate, glucose, sulfonic acid compounds such as sodium methane sulfonate, amine compounds such as dimethylaniline and ascorbic acid. The quantity of the reducing agent is preferably 0.03 to 10 parts by weight per part by weight of the polymerization initiator.

Surfactants or emulsifiers which are suitable for stabilizing the latex particles include those conventional surface-active agents for polymerization processes. The surfactant or surfactants can be added to the aqueous phase and/or the monomer phase. An effective amount of surfactant in a seed process is the amount which was chosen for supporting the stabilization of the particle as a colloid, the minimization of contact between the particles and the prevention of coagulation. In a non-seeded process, an effective amount of surfactant is the amount which was chosen for influencing the particle size.

Representative surfactants include saturated and ethylenically unsaturated sulfonic acids or salts thereof, including, for example, unsaturated hydrocarbonsulfonic acid, such as vinylsulfonic acid, allylsulfonic acid and methallylsulfonic acid, and salts thereof; aromatic hydrocarbon acids, such as, for example, p-styrenesulfonic acid, isopropenylbenzenesulfonic acid and vinyloxybenzenesulfonic acid and salts thereof; sulfoalkyl esters of acrylic acid and methacrylic acid, such as, for example, sulfoethyl methacrylate and sulfopropyl methacrylate and salts thereof, and 2-acrylamido-2-methylpropanesulfonic acid and salts thereof; alkylated diphenyl oxide disulfonates, sodium dodecylbenzenesulfonates and dihexyl esters of sodium sulfosuccinate, Sodium alkyl esters of sulfonic acid, ethoxylated alkylphenols and ethoxylated alcohols; fatty alcohol (poly)ethersulfates.

The type and the amount of the surfactant is governed typically by the number of particles, their size and their composition. Typically, the surfactant is used in amounts of from 0 to 20, preferably from 0 to 10, more preferably from 0 to 5, wt.-%, based on the total weight of the monomers. The amount of surfactant includes all values and sub-values there between, especially including 0, 0.1, 0.5, 1, 2, 3, 4, 5, 6, 7, 8, 9, 10, 11, 12, 13, 14, 15, 16, 17, 18 and 19 wt.-%, based on the total weight of the monomer. According to one embodiment of the present invention, the polymerization is conducted without using surfactants.

Various protective colloids can also be used instead of or in addition to the surfactants described above. Suitable colloids include polyhydroxy compounds, such as partially acetylated polyvinyl alcohol, casein, hydroxyethyl starch, carboxymethylcellulose, hydroxyethylcellulose, hydroxypropylcellulose, polysaccharides, and degraded polysaccharides, polyethylene glycol and gum arabic. The preferred protective colloids are carboxymethylcellulose, hydroxyethylcellulose and hydroxypropylcellulose. In general, these protective colloids are used in contents of from 0 to 10, preferably from 0 to 5, more preferably from 0 to 2 parts by weight, based on the total weight of the monomers. The amount of protective colloids includes all values and sub-values therebetween, especially including 1, 2, 3, 4, 5, 6, 7, 8 and 9 wt.-%, based on the total weight of the monomers.

The person skilled in the art will appreciate the type and amounts of monomers bearing polar functional groups, surfactants and protective colloids that are to be selected to make the polymer latex according to the present invention suitable for dip-molding applications. Thus, it is preferred that the polymer latex composition of the present invention has a certain maximum electrolyte stability determined as critical coagulation concentration of less than 30 mmol/l $CaCl_2$, preferably less than 25 mmol/l, more preferred less than 20 mmol/l, most preferred less than 10 mmol/l (determined for a total solids content of the composition of 0.1% at pH 10 and 23° C.).

If the electrolyte stability is too high, then it will be difficult to coagulate the polymer latex in a dip-molding process, with the result that either no continuous film of the polymer latex on the immersed mold is formed or the thickness of the resulting product is non-uniform.

It is within the routine of the person skilled in the art to appropriately adjust the electrolyte stability of a polymer latex. The electrolyte stability will depend on certain different factors, for example, amount and selection of monomers to be used for making the polymer latex, especially monomers containing polar-functional groups, as well as the selection and amount of the stabilizing system, for example, the emulsion polymerization process for making the polymer latex. The stabilizing system may contain surface-active agents and/or protective colloids.

A person skilled in the art is able, depending on the selected monomers and their relative amounts for making the polymer latex of the present invention, to adjust the stabilizing system in order to achieve an electrolyte stability according to the present invention.

Since there are so many different influences on the electrolyte stability, the adjustment is best made by trial and error experiments. But this can be easily done without any inappropriate effort using the test method for electrolyte stability, as disclosed above.

It is frequently advisable to perform the emulsion polymerization additionally in the presence of buffer substances and chelating agents. Suitable substances are, for example, alkali metal phosphates and pyrophosphates (buffer substances) and the alkali metal salts of ethylenediaminetetraacetic acid (EDTA) or hydroxyl-2-ethylenediaminetriacetic acid (HEEDTA) as chelating agents. The quantity of buffer substances and chelating agents is usually 0.001-1.0 wt.-%, based on the total quantity of monomers.

Furthermore, it may be advantageous to use chain transfer agents (regulators) in emulsion polymerization. Typical agents are, for example, organic sulfur compounds, such as thioesters, 2-mercaptoethanol, 3-mercaptopropionic acid and $C_1$-$C_{12}$ alkyl mercaptans, n-dodecylmercaptan and t-dodecylmercaptan being preferred. The quantity of chain transfer agents, if present, is usually 0.05-3.0 wt.-%, preferably 0.2-2.0 wt.-%, based on the total weight of the used monomers.

Furthermore, it can be beneficial to introduce partial neutralization to the polymerization process. A person skilled in the art will appreciate that by appropriate selections of this parameter the necessary control can be achieved.

Various other additives and ingredients can be added in order to prepare the latex composition of the present invention. Such additives include, for example: antifoams, wetting agents, thickeners, plasticizers, fillers, pigments, dispersants, optical brighteners, crosslinking agents, accelerators, antioxidants, biocides and metal chelating agents. Known antifoams include silicone oils and acetylene glycols. Customary known wetting agents include alkylphenol ethoxylates, alkali metal dialkylsulfosuccinates, acetylene glycols and alkali metal alkylsulfate. Typical thickeners include polyacrylates, polyacrylamides, xanthan gums, modified celluloses or particulate thickeners, such as silicas and clays. Typical plasticizers include mineral oil, liquid polybutenes, liquid polyacrylates and lanolin. Zinc oxide is a suitable crosslinking agent. Titanium dioxide ($TiO_2$), calcium carbonate and clay are the fillers typically used. Known accelerators and secondary accelerators include dithiocarbamates like zinc diethyl dithiocarbamate, zinc-dibutyl dithiocarbamate, zinc dibenyl dithiocarbamate, zinc pentamethylene dithiocarbamate (ZPD), xanthates, thiurams like tetramethylthiuram monosulfide (TMTM), Tetramethylthiuram disulfide (TMTD), tetraethylthiuram disulfide (TETD), dipentamethylenethiuram hexasulfide (DPTT), and amines, such as diphenylguanidine (DPG), di-o-tolylguanidine (DOTG), o-tolylbiguanidine (OTBG).

In an alternative embodiment of the present invention a polymer latex comprising the particles of latex polymer (a) and a polymer latex comprising the particles of latex polymer (b) are preformed and subsequently both latices are combined. The emulsion polymerization for the preparation of the preformed latices comprising the latex polymer (a) and the latex polymer (b) respectively can be conducted in the same manner as described above for the preparation of the latex comprising the latex polymer (a) including all variations disclosed.

The polymer latex of the present invention may comprise 50 to 99 wt.-%, preferably 60 to 98, more preferred 65 to 97, most preferred 70 to 96 wt.-%, based on the total weight of latex particles in the composition of particles of latex polymer (a) and 1 to 50 wt.-%, preferably 2 to 40, more preferred 3 to 35, most preferred 4 to 30 wt.-%, based on the total weight of latex particles in the composition of the oxirane-functional latex polymer (b). Thus, the lower limit for the amount of particles of latex polymer (a) may be 50 wt.-%, or 55 wt.-%, or 58 wt.-%, or 60 wt.-%, or 62 wt.-%, or 63 wt.-%, or 64 wt.-%, or 65 wt.-%, or 66 wt.-%, or 67 wt.-%, or 68 wt.-%, or 69 wt.-%, or 70 wt.-%, based on the total weight of latex particles in the composition. The upper limit for the amount of particles of latex polymer (a) may be 99 wt.-%, or 98 wt.-%, or 97 wt.-%, or 96 wt.-%, or 95 wt.-%, or 94 wt.-%, or 93 wt.-%, or 92 wt.-%, or 91 wt.-%, or 90 wt.-%, or 89 wt.-%, or 88 wt.-%, or 87 wt.-%, or 86 wt.-%, or 85 wt.-%, or 84 wt.-%, or 83 wt.-%, or 82 wt.-%, or 81 wt.-%, or 80 wt.-%, based on the total weight of latex particles in the composition. The lower limit for the amount of particles of latex polymer (b) may be 1 wt.-%, or 1 wt.-%, or 1 wt.-%, or 1 wt.-%, or 5 wt.-%, or 6 wt.-%, or 7 wt.-%, or 8 wt.-%, or 9 wt.-%, or 10 wt.-%, or 11 wt.-%, or 12 wt.-%, or 13 wt.-%, or 14 wt.-%, or 15 wt.-%, or 16 wt.-%, or 17 wt.-%, or 18 wt.-%, or 19 wt.-%, or 20 wt.-%, based on the total weight of latex particles in the composition. The upper limit for the amount of particles of latex polymer (b) may be 50 wt.-%, or 45 wt.-%, or 42 wt.-%, or 40 wt.-%, or 38 wt.-%, or 37 wt.-%, or 36 wt.-%, or 35 wt.-%, or 34 wt.-%, or 33 wt.-%, or 32 wt.-%, or 31 wt.-%, or 30 wt.-%, based on the total weight of latex particles in the composition. A person skilled in the art will understand that any range formed by any of the explicitly disclosed lower limits and upper limits is explicitly encompassed in the present specification.

For the preparation of the polymer latex of the present invention it is also possible that the mixture of ethylenically unsaturated monomers for latex polymer (a) is polymerized in presence of particles of the oxirane-functional latex polymer (b) in the free-radical emulsion polymerization forming a first polymer latex, (for example particles of the oxirane-functional latex polymer (b) can be present as seed particles) to form a first polymer latex and a second polymer latex comprising the particles of latex polymer (b) is preformed and subsequently both latices are combined, wherein the the oxirane-functional latex polymer (b) present in the polymerization of latex polymer (a) and the second polymer latex comprising the particles of latex polymer (b) may be the same or different. The respective emulsion polymerizations for forming the first and the second latex can be conducted in the same manner as described above for the preparation of the latex comprising the latex polymer (a) including all variations disclosed.

In said case the polymer latex of the present invention may comprise 50 to 99 wt.-%, preferably 60 to 98, more preferred 65 to 97, most preferred 70 to 96 wt.-%, based on the total weight of latex particles in the composition of particles of latex polymer (a) prepared in presence of particles of the oxirane-functional latex polymer (b) in an amount of 0.01 to 10, preferably 1 to 5 parts by weight based on 100 parts by weight of total ethylenically unsaturated monomers in the polymer latex (a) including those for making the oxirane-functional latex polymer (b) present in the polymerization of latex polymer (a) and 1 to 50 wt.-%, preferably 2 to 40, more preferred 3 to 35, most preferred 4 to 30 wt.-%, based on the total weight of latex particles in the composition of the second oxirane-functional latex particles (b).

The lower limit of the amount of oxirane-functional latex polymer (b) for the preparation of the first latex therefore can be 0.01, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, or 2.5 parts by weight. The upper limit of the amount can be 10, 9, 8, 7, 6, 5.5, 5, 4.5, 4, 3.8, 3.6, 3.4, 3.3, 3.2, 3.1 or 3 parts by weight. A person skilled in the art will understand that any range formed by any of the explicitly disclosed lower limits and upper limits is explicitly encompassed in the present specification.

Thus the lower limit for the amount of particles of the latex polymer (a) may be 50 wt.-%, or 55 wt.-%, or 58 wt.-%, or 60 wt.-%, or 62 wt.-%, or 63 wt.-%, or 64 wt.-%, or 65 wt.-%, or 66 wt.-%, or 67 wt.-%, or 68 wt.-%, or 69 wt.-%, or 70 wt.-%, based on the total weight of latex particles in the composition. The upper limit for the amount of particles of the latex polymer (a) may be 99 wt.-%, or 98 wt.-%, or 97 wt.-%, or 96 wt.-%, or 95 wt.-%, or 94 wt.-%, or 93 wt.-%, or 92 wt.-%, or 91 wt.-%, or 90 wt.-%, or 89 wt.-%, or 88 wt.-%, or 87 wt.-%, or 86 wt.-%, or 85 wt.-%, or 84 wt.-%, or 83 wt.-%, or 82 wt.-%, or 81 wt.-%, or 80 wt.-%, based on the total weight of latex particles in the composition. The lower limit for the amount of particles of the second latex polymer (b) may be 1 wt.-%, or 1 wt.-%, or 1 wt.-%, or 1 wt.-%, or 5 wt.-%, or 6 wt.-%, or 7 wt.-%, or 8 wt.-%, or 9 wt.-%, or 10 wt.-%, or 11 wt.-%, or 12 wt.-%, or 13 wt.-%, or 14 wt.-%, or 15 wt.-%, or 16 wt.-%, or 17 wt.-%, or 18 wt.-%, or 19 wt.-%, or 20 wt.-%, based on the total weight of latex particles in the composition. The upper limit for the amount of particles of the second latex polymer (b) may be 50 wt.-%, or 45 wt.-%, or 42 wt.-%, or 40 wt.-%, or 38 wt.-%, or 37 wt.-%, or 36 wt.-%, or 35 wt.-%, or 34 wt.-%, or 33 wt.-%, or 32 wt.-%, or 31 wt.-%, or 30 wt.-%, based on the total weight of latex particles in the composition. A person skilled in the art will understand that any range formed by any of the explicitly disclosed lower limits and upper limits is explicitly encompassed in the present specification.

Compounded Latex Composition for the Production of Dip-Molded Articles:

The polymer latex of the present invention is particularly suitable for dip-molding processes. Therefore, according to one aspect of the present invention the polymer latex is compounded to produce a curable polymer latex compound composition that can be directly used in dip-molding processes. To get reproducible good physical film properties, it is advisable to adjust the pH of the compounded polymer latex composition by pH modifiers to be in the range of pH 7 to 11, preferably 8 to 10, more preferred 9 to 10, for dipping to produce thin disposable gloves. For producing unsupported and/or supported reusable gloves, it is advisable to adjust the pH of the compounded polymer latex composition by pH modifiers to be in the range of pH 8 to 10, preferably 8.5 to 9.5. The compounded polymer latex composition contains the polymer latex of the present invention, optionally the pH modifiers, preferably ammonia or alkali hydroxides and optionally usual additives to be used in these compositions selected from antioxidants, pigments, TiO$_2$, fillers and dispersing agents.

Alternatively, instead of compounding the polymer latex of the present invention also a polymer latex comprising the latex polymer (a) as defined above may be compounded in the same way as described above and during or after the compounding step a polymer latex comprising the oxirane-functional latex polymer (b) as defined above is added to provide the compounded latex composition of the present invention. Also a polymer latex comprising the oxirane-functional latex polymer (b) as defined above may be compounded in the same way as described above and during or after the compounding step a polymer latex (a) as defined above is added to provide the compounded latex composition of the present invention. Of course, all variations with respect to the latex polymer (a), oxirane-functional latex polymer (b) and their relative amounts based on the total amount of latex polymer as described above can be used.

It is possible to add conventional vulcanization systems to the compounded polymer latex composition according to the present invention to be used in dip-molding processes, such as sulfur in combination with accelerators, such as thiurams and carbamates and zinc oxide to make it curable. Alternatively or additionally, a crosslinker component like, for example, polyvalent cations or other polyfunctional organic compounds suitable to react with functional groups on the latex particles in order to achieve chemical crosslinking may be added. But it is a particular advantage of the present invention that sulfur vulcanization systems and cross-linkers may be totally avoided, and the polymer latex compound of the present invention is still curable to provide dip-molded articles having the required tensile properties.

In certain heavy duty applications like industrial gloves it might be advantageous to employ, in addition to the self-crosslinking properties of the polymer latex of the present invention, conventional sulfur vulcanization systems as described above in order to further increase the mechanical strength of the dip-molded articles.

Method for Making Dip-Molded Articles:

In the method for making dip-molded latex articles according to the present invention, first, a mold having the desired shape of the final article is immersed in a coagulant bath comprising a solution of a metal salt. The coagulant is usually used as a solution in water, an alcohol or a mixture thereof. As specific examples of the coagulant the metal salts can be metal halides like calcium chloride, magnesium chloride, barium chloride, zinc chloride and aluminum chloride; metal nitrates such as calcium nitrate, barium nitrate and zinc nitrate; metal sulfates like calcium sulfate, magnesium sulfate, and aluminum sulfate; and acetic acid salts such as calcium acetate, barium acetate and zinc acetate. Most preferred are calcium chloride and calcium nitrate. The coagulant solution might contain additives to improve the wetting behavior of the former.

Thereafter, the mold is removed from the bath and optionally dried. The such treated mold is then immersed in the compounded latex composition according to the present invention. Thereby, a thin film of latex is coagulated on the surface of the mold. Alternatively, it is also possible to obtain the latex film by a plurality of dipping steps, particularly two dipping steps in sequence.

Thereafter, the mold is removed from the latex composition and optionally immersed in a water bath in order to extract, for example, polar components from the composition and to wash the coagulated latex film.

Thereafter, the latex coated mold is optionally dried at temperature below 80° C.

Finally, the latex coated mold is heat-treated at a temperature of 40-180° C. in order to obtain the desired mechanical properties for the final film product. Then, the final latex film is removed from the mold. The duration of the heat treatment will depend on the temperature and is typically between 1 and 60 minutes. The higher the temperature, the shorter is the required treatment time.

The inventors of the present invention surprisingly discovered that the dip-molding process can be run more economically when employing the polymer latex of the present invention. Particularly, it was discovered that the duration between forming the compounded latex composition according to the present invention and performing the dip-molding step (maturation time) can be considerably reduced to 180 min or less, compared to compounds made from standard latices that need a maturing time of well above 180 min.

Additionally, the inventors found that the temperature in the heat treatment step can be considerably reduced to be within a range of 40° C. to less than 120° C. without compromising the mechanical properties of the final dip-molded product. Conventional latices require temperature of 120° C. and above to achieve the desired mechanical properties. Thus, when employing the polymer latex of the present invention, the dip-molding process is less time-consuming and less energy-consuming, making it more economical.

According to the present invention, it is therefore preferred that in the compounding step (a)
(i) the polymer latex according to the present invention is compounded by adjusting the pH to a range of 7 to 12, preferably 7.5 to 11, more preferred 8 to 10 and by optionally adding ZnO; or
(ii) a polymer latex comprising the particles of the latex polymer (a) as defined above is compounded by adjusting the pH to a range of 7 to 12, preferably 7.5 to 11, more preferred 8 to 10, and by optionally adding ZnO and by subsequently adding preformed particles of latex polymer (b) as defined above; or
(III) a polymer latex comprising the particles of polymer (b) as defined above is compounded by adjusting pH to a range of 7 to 12, preferably 7.5 to 11, more preferred 8 to 10, and optionally adding ZnO and by subsequently adding preformed particles of latex polymer (a) as defined above; and the thereby obtained compounded latex composition being free of sulfur vulcanization agents and sulfur vulcanization accelerators is matured for less than 180 min, preferably 10 min to 150 min, more preferred 20 min to 120 min, most preferred 30 min to 90 min prior to be employed in the immersing step d); and/or in heat treating step h) the latex-coated mold is heat-treated at a temperature of 40° C. to less than 120° C., preferably 60° C. to 100° C., more preferred 70° C. to 90° C.

The final heat-treated polymer latex film has a tensile strength of at least about 7 MPa and an elongation at break of at least about 300%, preferably a tensile strength of at least about 10 MPa, an elongation at break of at least about 350%, more preferred a tensile strength of at least about 15 MPa and an elongation at break of at least about 400% and even more preferred a tensile strength of at least about 20 MPa and an elongation at break of at least about 500%. These mechanical properties were measured according to ASTM D412.

Furthermore, it was surprisingly found by the inventors that the dip-molded articles made with the polymer latex of the present invention exhibited a hitherto unknown superior solvent resistance which makes the polymer latex of the present invention particularly suitable for the preparation of industrial gloves.

This process can be used for any latex article that can be produced by a dip-molding process known in the art.

The present invention is especially applicable for dip-molded latex articles selected from health care devices, like surgical gloves, examination gloves, condoms, catheters or all different kinds of industrial and household gloves.

Furthermore, the polymer latex of the present invention can also be used for the coating and impregnation of substrates, preferably textile substrates. Suitable products obtained thereby are textile-supported gloves.

The present invention will be further illustrated with reference to the following examples.

EXAMPLES

Determination of Physical Parameters:

The dispersions were characterized by determination of total solids content (TSC), pH value, viscosity (Brookfield LVT) and z-average particle size. Furthermore, the final gloves or films were tested for tensile properties, durability and solvent permeation.

Determination of Total Solid Contents (TSC):

The determination of total solids content is based on a gravimetric method. 1-2 g of the dispersion are weighed on an analysis balance into a tarred aluminum dish. The dish is stored for 1 hour at 120° C. in a circulating air oven until constant mass is reached. After cooling to room temperature the final weight is determined again. The solids content is calculated as follows:

$$TSC = \frac{m_{initial} - m_{final}}{m_{initial}} 100\%$$

$m_{initial}$ = initial weight, $m_{final}$ = weight after drying

Determination of pH Value:

The pH value is determined according to DIN ISO 976. After 2 point calibration with buffer solutions the electrode of a Schott CG 840 pH meter was immersed in the dispersion at 23° C. and the constant value on the display was recorded as pH value.

Determination of Viscosity:

The viscosities were determined at 23° C. with an Brookfield LVT viscometer. Approximately 220 ml of the liquid (freed of air bubbles) was filled into a 250 ml beaker and the spindle of the viscometer was immersed up to the mark. The viscometer is then switch on and after approximately 1 minute the value is recorded until it is constant. The viscosity range determines the choice of spindle and rotational speed and the factor for the recorded value to calculate the viscosity. The information about spindle and revolutions per minute are shown in brackets in the Table 1.

Determination of Particle Size (PS):

The z-average particle size was measured with a Malvern zetasizer nano S (ZEN 1600) using dynamic light scattering. The latex sample was diluted with deionized water to the turbidity level described in the manual and transferred in the test cuvette. The cuvette was gently mixed to make the sample homogeneous and the cuvette was placed in the measurement device. The value was recorded as z-average particle size.

Determination of Tensile Properties:

The tensile properties of the final gloves or films were tested according to ASTM D412 test procedure. 6 mm type C dumbbell specimens were cut from palm area of gloves or films prepared from each latex compound; the un-aged samples were conditioned at 23±2° C. and 50±5% relative humidity for 24 hours prior to testing on the Hounsfield HK10KS Tensiometer fitted with H500LC extensometer. The film thickness (mm) was measured using a thickness gauge (supplied by Sylvac, model, Studenroth, type 12.5 mm/0.001; a typical film thickness value was 0.050-0.060 mm±0.002). The reported tensile strength corresponds to the determined maximum tensile stress in stretching the specimen to rupture. The ultimate elongation corresponds to the elongation at which rupture occurs.

Determination of Durability:

The gloves were conditioned in the climate room at 23° C. (±2) at 50% (+5) relative humidity for 16 hours before determination. The gloves to be tested were cut using scissors in a straight line from the crotch between index and middle finger to the cuff line below the thumb. The thumb and finger sample cut was kept along the outside edge to a point at the tip of the thumb. The sample was opened and the tip of the index finger was attached into the top jaws of the automated stress and relaxation equipment and the clamp was shut. The lower area of the sample was attached between the jaws at the lower clamp and the clamp was shut. The free "wing" of the sample was attached to the sidebars of the test equipment by using masking tape. The test equipment was positioned into the beaker containing the aqueous citric acid solution at pH 4 so that the crotch between the thumb and index finger was fully immersed in the aqueous acid solution. The test equipment was set to zero (0) and the test was started. The test was conducted at 25° C. The measurement stopped automatically when the sample broke and the number of cycles required reaching break point were recorded. The test was repeated 5 times to allow an average to be calculated, whereby fresh aqueous citric acid solution was used for each test. The reported durability (in minutes) corresponds to the average number of cycles (average number of cycles required to cause the sample failure) divided by 267 (total cycle per hour) and multiplied by 60. The test was stopped after 5 hours.

Determination of Solvent Permeation:

Solvent permeation was tested on the final gloves in accordance to test method which is in compliance with EN 374-3. Acetone was used as organic test solvent. Samples were cut (50 mm diameter) at palm area. Films to be tested must be free of any surface defects or pinholes. Film thickness was taken at 5 different places and the average thickness was recorded. The film thickness (mm) was measured using a thickness gauge (supplied by Sylvac, model, Studenroth, type 12.5 mm/0.001; a typical film thickness value was 0.050-0.060 mm+0.002). Solvent permeation was determined via the breakthrough time (BTT) (in minutes): BTT was measured by using QUMAT 401 with FID. During the testing, the sample was clamped to the cell with a constant gas flow at 200 ml/min. The sample will be fixed in a test chamber. The organic solvent was applied to the exterior site and the time was measured it takes to detect the chemical on the inside surface. The detection device is flame ionization detector (FID) with hydrogen as burnable gas.

Following Abbreviations are Used in the Examples:
BA=n-butyl acrylate
MMA=methyl methacrylate
MAA=methacrylic acid
B=butadiene
ACN=acrylonitrile
GMA=glycidyl methacrylate
tDDM=tert dodecyl mercaptan
Na$_4$EDTA=tetra sodium salt of ethylenediaminetetraacetic acid
tBHP=tert. butyl hydroperoxide
TSC=total solid content
PS=particle size In the following all part and percentages are based on weight unless otherwise specified.

Preparation Example 1 (Latex 1-3)

A 2 L 6-necked glass reactor fitted with reflux condenser, blade stirrer and thermoelement placed in a thermostat Lauda Proline P 26 with temperature control device was charged with 2.9 parts by weight of sodium lauryl sulfate dissolved in 123 parts by weight of water relative to 100 parts by weight monomer and heated to a temperature of 80° C. 0.23 parts by weight of ammonium peroxodisulfate (4% solution in water) were added in an aliquot addition. After 5 minutes 100 parts of monomers as indicated in Table 1 (amounts of monomers are given in parts by weight) together with 0.37 parts by weight of sodium lauryl sulfate dissolved in 105 parts by weight water were added over a period of 2 hours. After the addition of the monomers the temperature was maintained at 80° C. The polymerization was maintained up to a conversion of 99%. The reaction mixture was cooled to room temperature and sieved through a filter screen (90 μm). The properties of the latex are summarized in Table 1.

Preparation Example 2 (Latex 4-7)

A nitrogen-purged stainless steel pressure autoclave was charged with 2.0 parts by weight of sodium dodecyl benzene sulfonate dissolved in 185 parts by weight of water relative to 100 parts by weight monomer and heated to a temperature of 70° C. 0.1 parts by weight of tDDM, 0.05 parts by weight of Na$_4$EDTA and methacrylic acid in the amount given in Table 1 were added to the initial charge. 0.7 parts by weight of ammonium peroxodisulfate (12% solution in water) were added in an aliquot addition. Then butadiene, acrylonitrile in the amount given in Table 1 and a solution of 5.0 parts by weight of sodium dodecyl benzene sulfonate dissolved in 50 parts by weight of water were added over a period of 4.5 hours. The addition of GMA in the amount given in Table 1 was started after 2 h and added over a period of 2.5 hours. After the addition of the monomers the temperature was maintained at 70° C. The polymerization was maintained up to a conversion of 99%. The residual monomers were removed by vacuum distillation at 60° C. The reaction mixture was cooled to room temperature and sieved through a filter screen (90 μm). The properties of the prepared latices are summarized in Table 1.

TABLE 1

| | | | | Properties of Prepared Latices | | | | | | |
|---|---|---|---|---|---|---|---|---|---|---|
| Latex | BA | MMA | MAA | B | ACN | GMA | TSC [%] | pH | Viscosity [mPas] | PS [nm] |
| 1 | 53.0 | 46.0 | 1.0 | 0 | 0 | 0 | 30.0 | 2.5 | 17 (2/60) | 31 |
| 2 | 42.8 | 36.2 | 1.0 | 0 | 0 | 20 | 30.3 | 4.3 | 109 (1/60) | 27 |
| 3 | 42.8 | 34.2 | 3.0 | 0 | 0 | 20 | 30.3 | 4.2 | 80 (1/60) | 27 |

TABLE 1-continued

Properties of Prepared Latices

| Latex | BA | MMA | MAA | B | ACN | GMA | TSC [%] | pH | Viscosity [mPas] | PS [nm] |
|---|---|---|---|---|---|---|---|---|---|---|
| 4 | 0 | 0 | 0.5 | 70 | 24.5 | 5 | 32.9 | 6.9 | 19 (2/60) | 32 |
| 5 | 0 | 0 | 0.5 | 30 | 9.5 | 60 | 33.1 | 6.8 | 28 (2/60) | 38 |
| 6 | 0 | 0 | 0.5 | 45 | 14.5 | 40 | 32.9 | 7.0 | 68 (2/60) | 39 |
| 7 | 0 | 0 | 0 | 45.4 | 14.6 | 40 | 31.8 | 7.3 | 8 (1/60) | 40 |

Example 1 (Comparative)

Synthomer X6810, a commercially available grade from Synthomer Sdn. Bhd, Malaysia, was compounded with 2 phr zinc oxide and 1.5 phr of titanium dioxide. The compound was stirred over 3 hours and then dipped at the resulted pH value of 8.2 and the resulted total solids content. Dipping was conducted manually. A liner glove was fitted to a former and the former was conditioned in an air circulated oven at 50° C. The former was dipped into the compound to the base of fingers without dwell and withdrawn. Then it was drained for 5 minutes and inverted (finger up) for 30 seconds at room temperature. The former was dipped into the compound again to required level and withdrawn without dwell. The former was allowed to drip off for 3 minutes, then inverted (fingers upwards) for 10 seconds at 25° C. Then, the former with the glove was dipped in aqueous calcium nitrate (10% w/w) with minimum dwell. Curing was done at 90° C. for 10 minutes, followed by 120° C. for 30 minutes. Finally, the cured glove was manually stripped from the former.

Example 2 (Comparative)

Synthomer X6810 was blended with Latex 1 (blending ratio 80:20 by weight wet) and compounded following the description of Example 1.

Example 3

Synthomer X6810 was blended with Latex 2 (blending ratio 80:20 by weight wet) and compounded following the description of Example 1.

Example 4

Synthomer X6810 was blended with Latex 3 (blending ratio 80:20 by weight wet) and compounded following the description of Example 1.

The obtained gloves were tested for solvent permeation. The results are summarized in Table 2.

TABLE 2

Solvent Permeation

| | Example 1 (comparative) | Example 2 (comparative) | Example 3 | Example 4 |
|---|---|---|---|---|
| Synthomer X6810 | 100 | 80 | 80 | 80 |
| Latex 1 | 0 | 20 | 0 | 0 |
| Latex 2 | 0 | 0 | 20 | 0 |
| Latex 3 | 0 | 0 | 0 | 20 |
| Film thickness [mm] | 1.55 | 1.47 | 2.02 | 1.79 |
| acetone permeation [min] | 2 | 4 | 13 | 9 |
| normalized for film thickness [min]/[mm] | 1.29 | 2.72 | 6.45 | 5.03 |

Example 5 (Comparative)

2 parts by weight (based on polymer solids) of Latex 1 and 80 parts by weight of water (based on 100 parts by weight of monomer including the Latex 1) were added to a nitrogen-purged pressure autoclave and subsequently heated to 30° C. Then 0.01 parts by weight of Na$_4$EDTA and 0.005 parts by weight of Bruggolite FF6 available from Brüggemann Chemical Asia Ltd. dissolved in 2 parts by weight of water were added, followed by 0.08 parts by weight of tert butyl hydroperoxide (tBHP) dissolved in 2 parts by weight of water.

Then, the monomers were added together with the tDDM over a period of 5 hours (30 parts by weight of acrylonitrile, 62 parts by weight of butadiene, 6 parts by weight of methacrylic acid diluted with 10 parts by weight of water and 0.6 parts by weight of tDDM). Over a period of 10 hours 2 parts by weight of sodium dodecyl benzene sulfonate, 0.2 parts by weight of tetra sodium pyrophosphate and 22 parts by weight of water were added. The co-activator feed of 0.13 parts by weight of Bruggolite FF6 in 8 parts by weight of water was added over 17 hours. The post activation of 0.08 parts by weight of tBHP dissolved in 4 parts by weight of water was injected in two aliquots (each 50%) after 10 and 17 hours. The temperature was maintained at 30° C. up to a conversion of 95%, resulting in a total solids content of 45%. The polymerization was short stopped by addition of 0.2 parts by weight of a 5% aqueous solution of diethylhdroxylamine. The pH was adjusted by potassium hydroxide (5% aqueous solution) to pH 7.5 and the residual monomers were removed by vacuum distillation at 60° C. 0.5 parts by weight of a Wingstay L type antioxidant (60% dispersion in water) was added to the raw latex and the pH was adjusted to 8.2 by addition of 5% aqueous solution of potassium hydroxide.

The raw latex was compounded with 1.0 phr of zinc oxide and 1.0 phr of titanium dioxide. The pH was adjusted to 10.0 by adding of a 5% ammonium hydroxide solution in water. Finally, the compound was diluted to 18 wt.-% total solids and then maturated by continuously stirring at 25° C. for 16 hours.

Dipping was conducted using a mold dipping machine and with a glove mold having textured fingers and smooth palm. The mold washed with surfactant solution was heated to 55-60° C. and then dipped into a coagulant solution comprising an 18 wt.-% aqueous solution of calcium nitrate at 60° C. for 1 second.

The mold was then placed in an oven set at 75° C. for 15 minutes. Subsequently the heated mold (temperature 55-65° C.) was dipped into the respective curable polymer latex composition by moving down the mold into the compounded latex for 7 seconds until the desired level (cuff level) was reached, maintaining the mold at said level for 5 seconds, followed by moving up the mold for 7 seconds. The latex-dipped former was then gelled in the oven for 1 minute at 100° C. After gelling, the beading at the gloves cuff was done manually and then the glove was leached in water for 1 minute at 60° C. The mold was then cured at 120° C. for 20 minutes. Finally, the cured gloves were manually stripped from the mold and tested for tensile properties and durability.

The results are reported in Table 3.

Example 6 (Comparative)

Example 5 was repeated with the exception that the added monomer composition was 29.5 parts by weight of acrylonitrile, 61.5 parts by weight of butadiene, 6 parts by weight of methacrylic acid diluted with 10 parts by weight of water and 1 parts by weight of GMA.

The results are reported in Table 3.

Example 7 (Comparative)

Example 5 was repeated with the exception that the added monomer composition was 28.5 parts by weight of acrylonitrile, 61 parts by weight of butadiene, 6 parts by weight of methacrylic acid diluted with 10 parts by weight of water and 2.5 parts by weight of GMA. The results are reported in Table 3.

Example 8 (Comparative)

Example 5 was repeated with the exception that the added monomer composition was 27.5 parts by weight of acrylonitrile, 59.5 parts by weight of butadiene, 6 parts by weight of methacrylic acid diluted with 10 parts by weight of water and 5 parts by weight of GMA. The results are reported in Table 3.

Example 9 (Comparative)

Example 5 was repeated with the exception that the added monomer composition was 25 parts by weight of acrylonitrile, 57 parts by weight of butadiene, 6 parts by weight of methacrylic acid diluted with 10 parts by weight of water and 10 parts by weight of GMA. The results are reported in Table 3.

Example 10

Example 5 was repeated with the exception that 2 parts by weight (based on polymer solids) of Latex 4 and 80 parts by weight of water (based on 100 parts by weight of monomer including the Latex 4) were added to a nitrogen-purged autoclave and subsequently heated to 30° C. The results are reported in Table 3.

Example 11

Example 5 was repeated with the exception that the raw latex of Example 5 was blended with Latex 5 to have 1 part by weight of GMA (based on 100 parts by weight of total monomer) in the blend and stirred for 1 hour at room temperature prior to compounding. The results are reported in Table 3.

Example 12

Example 5 was repeated with the exception that the raw latex of Example 5 was blended with Latex 6 to have 1 part by weight of GMA (based on 100 parts by weight of total monomer) in the blend and stirred for 1 hour at room temperature prior to compounding. The results are reported in Table 3.

TABLE 3

Tensile Properties and Durability

| Examples | 5(C) | 6(C) | 7(C) | 8(C) | 9(C) | 10 | 11 | 12 |
| --- | --- | --- | --- | --- | --- | --- | --- | --- |
| GMA (parts)*** | 0 | 1 | 2.5 | 5 | 10 | 0.1 | 1 | 1 |
| Elongation at break [%] | 561 | * | ** | ** | ** | 576 | 572 | 584 |
| Tensile Strength [%] | 29.3 | 9.2 | ** | ** | ** | 34.5 | 30.3 | 32.5 |
| Durability [min] | 39 | ** | ** | ** | ** | 49 | 66 | 87 |

\* Not within the working range of the measurement device
\*\* Film cracking during process
\*\*\*Based on 100 parts by weight of total monomers in the final latex Example 13 (Comparative)

2 parts by weight (based on polymer solids) of an oxirane free seed latex (average particle size 36 nm) and 80 parts by weight of water (based on 100 parts by weight of monomer including the seed latex) were added to a nitrogen-purged autoclave and subsequently heated to 30° C. Then 0.01 parts by weight of Na$_4$EDTA and 0.005 parts by weight of Bruggolite FF6 dissolved in 2 parts by weight of water were added, followed by 0.08 parts by weight of tBHP dissolved in 2 parts by weight of water. Then, the monomers were added together with the tDDM over a period of 5 hours (30 parts by weight of acrylonitrile, 62 parts by weight of butadiene and 6 parts by weight of methacrylic acid diluted with 10 parts by weight of water). Over a period of 10 hours 2 parts by weight of sodium dodecyl benzene sulfonate, 0.2 parts by weight parts by weight of tetra sodium pyrophosphate and 22 parts by weight of water were added. The co-activator feed of 0.13 parts by weight of Bruggolite FF6 in 8 parts by weight of water was added over 17 hours. The post activation of 0.08 parts by weight of tBHP dissolved in 4 parts by weight of water was injected in two aliquots (each 50%) after 10 and 17 hours. The temperature was maintained at 30° C. up to a conversion of 95%, resulting in a total solids content of 45%. The polymerization was short stopped by addition of 0.2 parts by weight of a 5% aqueous solution of diethylhdroxylamine. The pH was adjusted by potassium hydroxide (5% aqueous solution) to pH 7.5 and the residual monomers were removed by vacuum distillation at 60° C. 0.5 parts by weight of a Wingstay L type antioxidant (60% dispersion in water) was added to the raw latex and the pH was adjusted to 8.2 by addition of 5% aqueous solution of potassium hydroxide.

The latex of Example 13 was compounded in the following three ways:

a) The latex of Example 13 was compounded with 1 phr Zinc oxide, 0.8 phr of sulphur and 0.7 phr of an accelerator (zinc diethyldithiocarbamate), 1.0 phr of titanium dioxide and pH was adjusted to pH 10.0 by adding of a 5% ammonium hydroxide solution in water. The compound was diluted to a total solid content of 18% and matured under continuously stirring at 25° C. for 16 hours prior to dipping.

b) The latex of Example 13 was compounded with 1.0 phr of Zinc oxide, followed by 1.0 phr of Titanium dioxide. Then the pH was adjusted to 10.0 by adding of a 5% ammonium hydroxide solution in water. Finally, the compound was diluted to 18% and matured by continuously stirring at 25° C. for 16 hours prior to dipping.

c) The latex of Example 13 was compounded with 1.0 phr of titanium dioxide. The, the pH was adjusted to 10.0 by adding of a 5% ammonium hydroxide solution in water. Finally, the compound was diluted to 18% and matured by continuously stirring at 25° C. for 16 hours prior to dipping.

Dipping was conducted using a mold dipping machine and with a glove mold having textured fingers and smooth palm. The dipping was done as described in Example 5. The results are given in Table 4.

Example 14

Example 13 was repeated with the exception that the raw latex of Example 13 was blended with Latex 7 to have 1 part by weight of GMA (based on 100 parts by weight of monomer) in the blend and stirred for 1 hour at room temperature. The results are given in Table 4.

Example 15

Example 13 was repeated with the exception that the raw latex of Example 13 was blended with Latex 7 to have 2.3 parts by weight of GMA (based on 100 parts by weight of monomer) in the blend and stirred for 1 hour at room temperature The results are given in Table 4.

Example 16

Example 13 was repeated with the exception that the raw latex of Example 13 was blended with Latex 7 to have 4.3 parts by weight of GMA (based on 100 parts by weight of monomer) in the blend and stirred for 1 hour at room temperature. The results are given in Table 4.

TABLE 4

Tensile Properties and Durability

| Examples | GMA content [parts]* | Tensile Strength [MPa] | Elongation at break [%] | Durability [h] |
|---|---|---|---|---|
| Example 13a (C) | 0 | 37.0 | 582 | 5** |
| Example 13b (C) | 0 | 37.4 | 596 | 1.3 |
| Example 13c (C) | 0 | 33.1 | 642 | 1.1 |
| Example 14a | 1 | 34.9 | 545 | 5** |
| Example 14b | 1 | 37.6 | 610 | 1.8 |
| Example 14c | 1 | 26.4 | 607 | 3.2 |
| Example 15a | 2.3 | 34.7 | 535 | 5** |
| Example 15b | 2.3 | 37.5 | 582 | 5** |
| Example 15c | 2.3 | 29.0 | 622 | 4.7 |
| Example 16a | 4.3 | 34.4 | 506 | 5** |
| Example 16b | 4.3 | 37.8 | 546 | 5** |
| Example 16c | 4.3 | 29.3 | 576 | 5** |

*Based on 100 parts by weight of total monomers in the final latex.
**Measurement was stopped after 5 hours.

Example 17 (Comparative)

2 parts by weight (based on polymer solids) of an oxirane free seed latex (average particle size 36 nm) and 80 parts by weight of water (based on 100 parts by weight of monomer including the seed latex) were added to a nitrogen-purged autoclave and subsequently heated to 30° C. Then 0.01 parts by weight of $Na_4EDTA$ and 0.005 parts by weight of Bruggolite FF6 dissolved in 2 parts by weight of water were added, followed by 0.08 parts by weight of tBHP dissolved in 2 parts by weight of water. Then, the monomers were added together with the tDDM over a period of 5 hours (35 parts by weight of acrylonitrile, 58 parts by weight of butadiene and 5 parts by weight of methacrylic acid diluted with 10 parts by weight of water). Over a period of 10 hours 2 parts by weight of sodium dodecyl benzene sulfonate, 0.2 parts by weight parts by weight of tetra sodium pyrophosphate and 22 parts by weight of water were added. The co-activator feed of 0.10 parts by weight of Bruggolite FF6 in 8 parts by weight of water was added over 11 hours.

The temperature was maintained at 30° C. up to a conversion of 95%, resulting in a total solids content of 45 wt.-%. The polymerization was short stopped by addition of 0.2 parts by weight of a 5% aqueous solution of diethyl-hdroxylamine. The pH was adjusted by potassium hydroxide (5% aqueous solution) to pH 7.5 and the residual monomers were removed by vacuum distillation at 60° C. 0.5 parts by weight of a Wingstay L type antioxidant (60% dispersion in water) was added to the raw latex and the pH was adjusted to 8.2 by addition of 5% aqueous solution of potassium hydroxide.

The latex was compounded and dipped according to Example 13a. The compound was matured under continuously stirring at 25° C. for 16 hours and 3 hours respectively prior to dipping. Results are reported in Table 5.

Example 18

Example 17 was repeated with the exception that the raw latex was blended with Latex 7 to have 1 part by weight of GMA (based on 100 parts by weight of monomer) in the blend and stirred for 1 hour at room temperature. Then the blend was compounded and dipped as in Example 13b. The compound was diluted to 18% and conditioned by continuously stirring at 25° C. for 16 hours or 3 hours, respectively prior to dipping. Results are reported in Table 5.

Example 19

Example 17 was repeated with the exception that the raw latex was blended with Latex 7 to have 2.3 part by weight of GMA (based on 100 parts by weight of monomer) in the blend and stirred for 1 hour at room temperature. Then the blend was compounded and dipped as in Example 13b. The compound was diluted to 18% and conditioned by continuously stirring at 25° C. for 16 hours or 3 hours, respectively prior to dipping. Results are reported in Table 5.

Example 20

Example 17 was repeated with the exception that the raw latex was blended with Latex 7 to have 4.3 part by weight of GMA (based on 100 parts by weight of monomer) in the blend and stirred for 1 hour at room temperature. Then the blend was compounded and dipped as in Example 13b. The compound was diluted to 18% and conditioned by continuously stirring at 25° C. for 16 hours or 3 hours, respectively prior to dipping. Results are reported in Table 5.

TABLE 5

| Examples | GMA content [parts]* | Maturation time 3 hours | | | Maturation time 16 hours | | |
|---|---|---|---|---|---|---|---|
| | | Tensile Strength [MPa] | Elongation at break [%] | Durability [h] | Tensile Strength [MPa] | Elongation at break [%] | Durability [h] |
| Example 17 (C) | 0 | 42.2 | 591 | 4.4 | 41.4 | 587 | 5** |
| Example 18 | 1 | 40.5 | 564 | 5** | 39.1 | 558 | 5** |
| Example 19 | 2.3 | 40.2 | 554 | 5** | 38.7 | 519 | 4.6 |
| Example 20 | 4.3 | 40.8 | 504 | 5** | 38.7 | 486 | 5** |

*Based on 100 parts by weight of total monomers in the final latex.
**Measurement will be stopped after 5 hours.

Example 21 (Comparative)

Example 17 was repeated (matured by continuously stirring at 25° C. for 16 hours) with the exception that the mold was heat-treated for 20 minutes at 120° C. and at 80° C., respectively. Results are reported in Table 6.

Examples 22-24

Examples 18-20, respectively were repeated (matured by continuously stirring at 25° C. for 16 hours) with the exception that the mold was heat-treated for 20 minutes at 120° C. and at 80° C., respectively. Results are reported in Table 6.

TABLE 6

| Examples | GMA content [parts]* | Curing temp 120° C. | | | Curing temp 80° C. | | |
|---|---|---|---|---|---|---|---|
| | | Tensile Strength [MPa] | Elongation at break [%] | Durability [h] | Tensile Strength [MPa] | Elongation at break [%] | Durability [h] |
| Example 21(C) | 0 | 39.6 | 581 | 5** | 36.3 | 574 | 0.9 |
| Example 22 | 1 | 39.1 | 558 | 5** | 37.1 | 566 | 1.7 |
| Example 23 | 2.3 | 38.7 | 519 | 4.6 | 36.7 | 549 | 2.2 |
| Example 24 | 4.3 | 38.7 | 486 | 5** | 35.4 | 535 | 3.8 |

*Based on 100 parts by weight of total monomers in the final latex.
**Measurement will be stopped after 5 hours.

The invention claimed is:

1. A polymer latex for dip-molding applications comprising:
   (a) particles of a carboxylated conjugated diene nitrile latex polymer (a) obtainable by free-radical emulsion polymerization of a mixture of ethylenically unsaturated monomers comprising:
   15 to 99 wt.-% of conjugated dienes;
   1 to 80 wt.-% of monomers selected from ethylenically unsaturated nitrile compounds;
   0.05 to 10 wt.-% of ethylenically unsaturated acids and/or salts thereof;
   0 to 50 wt.-% of vinyl aromatic monomers; and
   −0 to 65 wt.-% of alkyl esters of ethylenically unsaturated acids,
   the weight percentages being based on the total monomers in the mixture, in combination or association with
   (b) particles of an oxirane functional latex polymer (b) comprising structural units derived from ethylenically unsaturated oxirane-functional monomers in an amount of 10 to 80 wt.-% based on the total weight of monomers for the oxirane functional latex particles (b); wherein
   the monomer composition of the latex polymer (a) is different from the monomer composition of the latex polymer (b).

2. The polymer latex of claim 1, wherein
   the conjugated dienes of the latex polymer (a) are selected from butadiene, isoprene, 2,3-dimethyl-1,3-butadiene, 2-ethyl-1,3-butadiene, 1,3-pentadiene or combinations thereof;
   the ethylenically unsaturated nitrile compounds of the latex polymer (a) are selected from (meth)acrylonitrile, alpha-cyanoethyl acrylonitrile, fumaronitrile, alpha-chloronitrile or combinations thereof;
   the ethylenically unsaturated acids and salts thereof of the latex polymer (a) are selected from (meth)acrylic acid, crotonic acid, itaconic acid, maleic acid, fumaric acid, ethylenically unsaturated sulfonic acids, ethylenically unsaturated phosphorous containing acids and salts thereof, polycarboxylic acid anhydride and polycarboxylic acid partial ester monomer or combinations thereof;
   the vinyl aromatic monomers of the latex polymer (a) are selected from styrene, alpha-methyl styrene or combinations thereof;
   the alkyl esters of ethylenically unsaturated acids of the latex polymer (a) are selected from methyl (meth)acrylate, ethyl (meth)acrylate, propyl (meth)acrylate, butyl (meth)acrylate, 2-ethylhexyl (meth)acrylate or combinations thereof;
   the mixture of ethylenically unsaturated monomers for latex polymer (a) optionally comprises ethylenically unsaturated monomers selected from
   hydroxyalkyl esters of ethylenically unsaturated acids;
   amides of ethylenically unsaturated acids;
   vinyl carboxylates;
   monomers having at least two ethylenically unsaturated groups;
   ethylenically unsaturated silanes; or
   combinations thereof.

3. The polymer latex of claim 1, wherein the mixture of ethylenically unsaturated monomers for latex polymer (a) comprises:

20 to 99 wt.-% of conjugated dienes;
1 to 60 wt.-% of monomers selected from ethylenically unsaturated nitrile compounds;
0 to 40 wt.-% of vinyl aromatic monomers;
0 to 25 wt.-% of $C_1$ to $C_8$ alkyl (meth)acrylates;
0.05 to 7 wt.-% of ethylenically unsaturated acids;
0 to 10 wt.-% of vinyl esters:
0 to 10 wt.-% of ethylenically unsaturated compounds bearing silane, amide and/or N-methylolamide groups,
the weight percentages being based on the total monomers in the mixture.

4. The polymer latex of claim 1, wherein the oxirane-functional latex polymer (b) comprises structural units derived from ethylenically unsaturated oxirane-functional monomers in an amount of 1 to 80 wt.-% based on the total weight of monomers for the oxirane-functional latex particles (b).

5. The polymer latex of claim 1, wherein the oxirane-functional latex polymer (b) comprises structural units derived from oxirane-functional ethylenically unsaturated monomers selected from
glycidyl (meth)acrylate, allyl glycidylether, vinyl glycidylether, vinyl cyclohexene oxide, limonene oxide, 2-ethylglycidylacrylate, 2-ethylglycidylmethacrylate, 2-(n-propyl)glycidylacrylate, 2-(n-propyl)glycidylmethacrylate, 2-(n-butyl)glycidylacrylate, 2-(n-butyl)glycidylmethacrylate, glycidylmethylmethacrylate, glycidylacrylate, (3',4'-epoxyheptyl)-2-ethylacrylate, (3',4'-epoxyheptyl)-2-ethylmethacrylate, (6',7'-epoxyheptyl)acrylate, (6',7'-epoxyheptyl)methacrylate, allyl-3,4-epoxyheptylether, 6,7-epoxyheptylallylether, vinyl-3,4-epoxyheptylether, 3,4-epoxyheptylvinylether, 6,7-epoxyheptylvinylether, o-vinylbenzylglycidylether, m-vinylbenzylglycidylether, p-vinylbenzylglycidylether, 3-vinyl cyclohexene oxide, alpha-methyl glycidyl methacrylate, 3,4-epoxycyclohexylmethyl (meth)acrylate or combinations thereof and
structural units of one or more monomers selected from ethylenically unsaturated nitrile compounds selected from (meth)acrylonitrile, alpha-cyanoethyl acrylonitrile, fumaronitrile or combinations thereof;
vinyl aromatic monomers;
alkyl esters of ethylenically unsaturated acids;
hydroxyalkyl esters of ethylenically unsaturated acids;
amides of ethylenically unsaturated acids;
ethylenically unsaturated acids;
vinyl carboxylates;
conjugated dienes;
monomers having at least two ethylenically unsaturated groups; or combinations thereof.

6. The polymer latex of claim 1, wherein the oxirane-functional latex polymer (b) comprises structural units derived from
(I) - 0 to 50 wt.-% of monomers selected from ethylenically unsaturated nitrile compounds;
0 to 95 wt.-% of vinyl aromatic monomers;
0 to 95 wt.-% of $C_1$ to $C_8$ alkyl (meth)acrylates;
0 to 10 wt.-% of ethylenically unsaturated acids;
0 to 10 wt.-% of ethylenically unsaturated compounds bearing silane, sulfonate, sulfonic acid, amide and/or N-methylolamide groups;
0 to 50 wt.-% of vinyl carboxylates;
10 to 80 wt.-% of structural units derived from ethylenically unsaturated oxirane-functional monomers; or
(II) - 2 to 95 wt.-% of conjugated dienes;
1 to 50 wt.-% of monomers selected from ethylenically unsaturated nitrile compounds;
0 to 95 wt.-% of vinyl aromatic monomers;
0 to 95 wt.-% of $C_1$ to $C_8$ alkyl (meth)acrylates;
0 to 10 wt.-% of ethylenically unsaturated acids;
0 to 10 wt.-% of ethylenically unsaturated compounds bearing silane, sulfonate, sulfonic acid, amide and/or N-methylolamide groups,
10 to 80 wt.-% of structural units derived from ethylenically unsaturated oxirane-functional monomers.

7. The polymer latex of claim 1, wherein
the z-average particle size measured using dynamic light scattering of the oxirane-functional latex particles (b) is 5 to 90 nm.

8. A method for preparation of a polymer latex comprising:
(i) polymerizing in an emulsion polymerization process a mixture of ethylenically unsaturated monomers for latex polymer (a) comprising:
15 to 99 wt.-% of conjugated dienes;
1 to 80 wt.-% of monomers selected from ethylenically unsaturated nitrile compounds;
0.05 to 10 wt.-% of ethylenically unsaturated acids and/or salts thereof;
0 to 50 wt.-% of vinyl aromatic monomers; and
0 to 65 wt.-% of alkyl esters of ethylenically unsaturated acids,
the weight percentages being based on the total monomers employed in the emulsion polymerization in an aqueous medium in presence of a free-radical initiator, stabilizers and latex particles comprising particles of a latex polymer (b) comprising at least one oxirane-functional group; or
(ii) (1) forming a latex polymer (a) by free-radical emulsion polymerization in an aqueous medium in presence of a free-radical initiator and stabilizers of a mixture of ethylenically unsaturated monomers comprising:
15 to 99 wt.-% of conjugated dienes;
1 to 80 wt.-% of monomers selected from ethylenically unsaturated nitrile compounds;
0.05 to 10 wt.-% of ethylenically unsaturated acids and/or salts thereof;
0 to 50 wt.-% of vinyl aromatic monomers; and
0 to 65 wt.-% of alkyl esters of ethylenically unsaturated acids,
the weight percentages being based on the total monomers employed in the emulsion polymerization;
(2) forming a latex polymer (b) comprising at least one oxirane-functional group; and
(3) combining latex polymer (a) and latex polymer (b); or
(iii) (1) polymerizing in an emulsion polymerization process a mixture of ethylenically unsaturated monomers for latex polymer (a) comprising:
15 to 99 wt.-% of conjugated dienes;
1 to 80 wt.-% of monomers selected from ethylenically unsaturated nitrile compounds;
0.05 to 10 wt.-% of ethylenically unsaturated acids and/or salts thereof;
0 to 50 wt.-% of vinyl aromatic monomers; and
0 to 65 wt.-% of alkyl esters of ethylenically unsaturated acids,
the weight percentages being based on the total monomers employed in the emulsion polymerization in an aqueous medium in presence of a free-radical initiator, stabilizers and latex particles comprising particles of a latex polymer (b) comprising at least one oxirane-functional group
(2) forming a latex polymer (b) comprising at least one oxirane-functional group; and (3) combining the latex of step (1) and the latex of step (2), wherein
the latex polymer (b) comprising at least one oxirane-functional group in step (1) and step (2) are the same or are different; and wherein
the monomer composition of the latex polymer (a) is different from the monomer composition of the latex polymer (b).

9. The method of claim 8, wherein for latex polymer (a):
the conjugated dienes are selected from butadiene, isoprene, 2,3-dimethyl-1,3-butadiene, 2-ethyl-1,3-butadiene, 1,3-pentadiene or combinations thereof;
the ethylenically unsaturated nitrile compounds are selected from (meth)acrylonitrile, alpha-cyanoethyl acrylonitrile, fumaronitrile, alpha-chloronitrile or combinations thereof;
the ethylenically unsaturated acids and salts thereof are selected from (meth)acrylic acid, crotonic acid, itaconic acid, maleic acid, fumaric acid, ethylenically unsaturated sulfonic acids, ethylenically unsaturated phosphorous containing acids and salts thereof, polycarboxylic acid anhydride and polycarboxylic acid partial ester monomer or combinations thereof;
the vinyl aromatic monomers are selected from styrene, alpha-methyl styrene or combinations thereof;
the alkyl esters of ethylenically unsaturated acids are selected from methyl (meth)acrylate, ethyl (meth)acrylate, propyl (meth)acrylate, butyl (meth)acrylate, 2-ethylhexyl (meth)acrylate or combinations thereof; and
the mixture of ethylenically unsaturated monomers for latex polymer (a) optionally comprises ethylenically unsaturated monomers selected from
hydroxyalkyl esters of ethylenically unsaturated acids;
amides of ethylenically unsaturated acids;
vinyl carboxylates;
monomers having at least two ethylenically unsaturated groups;
ethylenically unsaturated silanes; or
combinations thereof; and
wherein latex polymer (b) comprises:
structural units derived from oxirane-functional ethylenically unsaturated monomers selected from
glycidyl (meth)acrylate, allyl glycidylether, vinyl glycidylether, vinyl cyclohexene oxide, limonene oxide, 2-ethylglycidylacrylate, 2-ethylglycidylmethacrylate, 2-(n-propyl)glycidylacrylate, 2-(n-propyl)glycidylmethacrylate, 2-(n-butyl)glycidylacrylate, 2-(n-butyl)glycidylmethacrylate, glycidylmethylmethacrylate, glycidylacrylate, (3',4'-epoxyheptyl)-2-ethylacrylate, (3',4'-epoxyheptyl)-2-ethylmethacrylate, (6',7'-epoxyheptyl)acrylate, (6',7'-epoxyheptyl)methacrylate, allyl-3,4-epoxyheptylether, 6,7-epoxyheptylallylether, vinyl-3,4-epoxyheptylether, 3,4-epoxyheptylvinylether, 6,7-epoxyheptylvinylether, o-vinylbenzylglycidylether, m-vinylbenzylglycidylether, p-vinylbenzylglycidylether, 3-vinyl cyclohexene oxide, alpha-methyl glycidyl methacrylate, 3,4-epoxycyclohexylmethyl (meth)acrylate or combinations thereof and
structural units of one or more monomers selected from
ethylenically unsaturated nitrile compounds selected from (meth)acrylonitrile, alpha-cyanoethyl acrylonitrile, fumaronitrile or combinations thereof;
vinyl aromatic monomers;
alkyl esters of ethylenically unsaturated acids;
hydroxyalkyl esters of ethylenically unsaturated acids;
amides of ethylenically unsaturated acids;
ethylenically unsaturated acids;
vinyl carboxylates;
conjugated dienes;
monomers having at least two ethylenically unsaturated groups; or
combinations thereof.

10. A method for coating or impregnating a substrate by applying a polymer latex as defined in claim 1 to the substrate.

11. A compounded latex composition suitable for the production of dip-molded articles comprising:
the polymer latex according to claim 1 and optionally adjuvants selected from sulfur vulcanization agents, accelerators for sulfur vulcanization, crosslinkers, polyvalent cations or combinations thereof; or
a preformed compounded polymer latex comprising the particles of latex polymer (a) as defined in claim 1 and optionally adjuvants selected from sulfur vulcanization agents, accelerators for sulfur vulcanization, crosslinkers, polyvalent cations or combinations thereof and preformed particles of latex polymer (b) as defined in claim 1, or
a preformed compounded polymer latex comprising the particles of latex polymer (b) as defined in claim 1 and optionally adjuvants selected from sulfur vulcanization agents, accelerators for sulfur vulcanization, crosslinkers, polyvalent cations or combinations thereof and preformed particles of latex polymer (a) as defined in claim 1.

12. The compounded latex composition of claim 11, being free of sulfur vulcanization agents and accelerators for sulfur vulcanization.

13. A method for making dip-molded articles comprising:
a) providing a compounded latex composition of claim 11;
b) immersing a mold having the desired shape of the final article in a coagulant bath comprising a solution of a metal salt;
c) removing the mold from the coagulant bath and optionally drying the mold;
d) immersing the mold as treated in step b) and c) in the compounded latex composition of step a);
e) coagulating a latex film on the surface of the mold;
f) removing the latex-coated mold from the compounded latex composition and optionally immersing the latex-coated mold in a water bath;
g) optionally drying the latex-coated mold;
h) heat treating the latex-coated mold obtained from step e) or f) at a temperature of 40° C. to 180° C.; and
i) removing the latex article from the mold.

14. The method of claim 13, wherein in step a)
(i) a polymer latex comprising:
(a) particles of a carboxylated conjugated diene nitrile latex polymer (a) obtainable by free-radical emulsion polymerization of a mixture of ethylenically unsaturated monomers comprising:
15 to 99 wt.-% of conjugated dienes;
1 to 80 wt.-% of monomers selected from ethylenically unsaturated nitrile compounds;
0.05 to 10 wt.-% of ethylenically unsaturated acids and/or salts thereof;
0 to 50 wt.-% of vinyl aromatic monomers; and
0 to 65 wt.-% of alkyl esters of ethylenically unsaturated acids,
the weight percentages being based on the total monomers in the mixture in combination or association with
(b) particles of a latex polymer (b) comprising at least one oxirane-functional group; wherein the monomer composition of the latex polymer (a) is different from the monomer composition of the latex polymer (b),
is compounded by adjusting the pH to a range of 7 to 12 and by optionally adding ZnO; or
(ii) a polymer latex comprising the particles of latex polymer (a) comprising particles of a carboxylated conjugated diene nitrile latex polymer (a) obtainable by free-radical emulsion polymerization of a mixture of ethylenically unsaturated monomers comprising:
15 to 99 wt.-% of conjugated dienes;
1 to 80 wt.-% of monomers selected from ethylenically unsaturated nitrile compounds;
0.05 to 10 wt.-% of ethylenically unsaturated acids and/or salts thereof;
0 to 50 wt.-% of vinyl aromatic monomers; and
0 to 65 wt.-% of alkyl esters of ethylenically unsaturated acids,
the weight percentages being based on the total monomers in the mixture,
is compounded by adjusting the pH to a range of 7 to 12 and by optionally adding ZnO and by subsequently adding preformed particles of latex polymer (b) comprising at least one oxirane-functional group; or
(III) a polymer latex comprising the particles of latex polymer (b) comprising at least one oxirane-functional group,
is compounded by adjusting pH to a range of 7 to 12 and optionally adding ZnO and by subsequently adding preformed particles of latex polymer (a) comprising particles of a carboxylated conjugated diene nitrile latex polymer (a) obtainable by free-radical emulsion polymerization of a mixture of ethylenically unsaturated monomers comprising:
15 to 99 wt.-% of conjugated dienes;
1 to 80 wt.-% of monomers selected from ethylenically unsaturated nitrile compounds;
0.05 to 10 wt.-% of ethylenically unsaturated acids and/or salts thereof;
0 to 50 wt.-% of vinyl aromatic monomers; and
0 to 65 wt.-% of alkyl esters of ethylenically unsaturated acids,
the weight percentages being based on the total monomers in the mixture; and
the thereby obtained compounded latex composition being free of sulfur vulcanization agents and sulfur vulcanization accelerators is matured for less than 180 min prior to be employed in step d); and/or
in step h) the latex-coated mold is heat-treated at a temperature of 40° C. to less than 120° C.

15. An article comprising a polymer latex, wherein the polymer latex comprises:
(a) particles of a carboxylated conjugated diene nitrile latex polymer (a) obtainable by free-radical emulsion polymerization of a mixture of ethylenically unsaturated monomers comprising:
15 to 99 wt.-% of conjugated dienes;
1 to 80 wt.-% of monomers selected from ethylenically unsaturated nitrile compounds;
0.05 to 10 wt.-% of ethylenically unsaturated acids and/or salts thereof;
0 to 50 wt.-% of vinyl aromatic monomers; and
−0 to 65 wt.-% of alkyl esters of ethylenically unsaturated acids,
the weight percentages being based on the total monomers in the mixture,
in combination or association with (b) particles of an oxirane functional latex polymer (b) comprising structural units derived from ethylenically unsaturated oxirane-functional monomers in an amount of 10 to 80 wt.-% based on the total weight of monomers for the oxirane functional latex particles (b); wherein
the monomer composition of the latex polymer (a) is different from the monomer composition of the latex polymer (b).

16. The article of claim 15, wherein the article is selected from the group consisting of surgical gloves, examination gloves, condoms, catheters, industrial gloves, textile-supported gloves or household gloves.

17. An article made by using the polymer latex according to claim 11.

18. The polymer latex of claim 1, wherein the mixture of ethylenically unsaturated monomers for latex polymer (a) is polymerized in presence of particles of the oxirane-functional latex polymer (b) in the free-radical emulsion polymerization.

19. The polymer latex of claim 18, wherein the particles of the oxirane-functional latex polymer (b) are present in an amount of 0.01 to 10 parts by weight based on 100 parts by weight of total ethylenically unsaturated monomers in the polymer latex including those for making the oxirane-functional latex polymer (b).

20. The polymer latex of claim 1, wherein a polymer latex comprising the particles of latex polymer (a) and a polymer latex comprising the particles of latex polymer (b) are preformed and subsequently both lattices are combined.

21. The polymer latex of claim 20, wherein the polymer latex comprises 50 to 99 wt.-% based on the total weight of latex particles in the composition of particles of latex polymer (a), and 1 to 50 wt.-% based on the total weight of latex particles in the composition of particles of the oxirane-functional latex polymer (b).

22. The polymer latex of claim 1, wherein the mixture of ethylenically unsaturated monomers for latex polymer (a) is polymerized in presence of particles the oxirane-functional latex polymer (b) in the free-radical emulsion polymerization forming a first polymer latex, and a second polymer latex comprising the particles of latex polymer (b) is preformed and subsequently both lattices are combined, wherein the latex comprising the oxirane-functional latex particles (b) for making the first polymer latex and the second polymer latex comprising the particles of latex polymer (b) are the same or are different.

23. The polymer latex of claim 21, wherein the polymer latex comprises 50 to 99 wt.-% based on the total weight of latex particles in the composition of particles of latex polymer (a) prepared in presence of particles of the oxirane-functional latex polymer (b) in an amount of 0.01 to 10 based on 100 parts by weight of total ethylenically unsaturated monomers in the polymer latex (a) including those for making the oxirane-functional latex polymer (b) present in the polymerization of latex polymer (a) and 1 to 50 wt.-%, based on the total weight of latex particles in the composition of the second oxirane-functional latex particles (b).

24. The polymer latex of claim 1, wherein the particles of the oxirane functional latex polymer (b) comprise structural units derived from ethylenically unsaturated oxirane-functional monomers in an amount of 20 to 80 wt.-% based on the total weight of monomers for the oxirane functional latex particles (b).

25. The polymer latex of claim 1, wherein the particles of the oxirane functional latex polymer (b) comprise structural units derived from ethylenically unsaturated oxirane-functional monomers in an amount of 22 to 80 wt.-% based on the total weight of monomers for the oxirane functional latex particles (b).

* * * * *